United States Patent [19]

Yoshimura et al.

[11] Patent Number: 4,619,859

[45] Date of Patent: Oct. 28, 1986

[54] HIGHLY-ORIENTED STRETCHABLE MULTILAYER FILM AND PROCESS FOR PRODUCING THE SAME

[75] Inventors: Isao Yoshimura, Fujisawa; Hideo Hata, Yokohama, both of Japan

[73] Assignee: Asahi Kasei Kogyo Kabushiki Kaisha, Osaka, Japan

[21] Appl. No.: 654,149

[22] Filed: Sep. 25, 1984

[30] Foreign Application Priority Data

Oct. 7, 1983 [JP] Japan ................................. 58-187079

[51] Int. Cl.$^4$ ............................................. B32B 27/08
[52] U.S. Cl. .................................... 428/213; 428/349; 428/500; 428/516; 428/518; 428/520; 428/522; 428/910
[58] Field of Search ....................... 428/213, 518–522, 428/516, 910, 349

[56] References Cited

U.S. PATENT DOCUMENTS

| | | | |
|---|---|---|---|
| 3,375,126 | 3/1968 | Nagel | 428/518 |
| 3,579,416 | 5/1971 | Schrenk | 428/518 |
| 3,847,728 | 11/1974 | Hirata | 428/518 |
| 4,082,877 | 4/1978 | Shadle | 428/35 |
| 4,399,181 | 8/1983 | Yoshimura et al. | 428/213 |
| 4,430,377 | 2/1984 | Yoshimura et al. | 428/213 |
| 4,430,378 | 2/1984 | Yoshimura et al. | 428/213 |
| 4,439,478 | 3/1984 | Ferguson et al. | 428/213 |
| 4,469,752 | 9/1984 | Yoshimura et al. | 428/475.8 |
| 4,469,753 | 9/1984 | Yoshimura et al. | 428/475.8 |
| 4,472,228 | 9/1984 | Yoshimura et al. | 156/244.24 |
| 4,501,634 | 2/1985 | Yoshimura et al. | 156/244.24 |

FOREIGN PATENT DOCUMENTS 1178415  11/1984  Canada .

*Primary Examiner*—Edith Buffalow
*Attorney, Agent, or Firm*—Birch, Stewart, Kolasch & Birch

[57] ABSTRACT

The present invention provides primarily an entirely new type multilayer oriented film suited for stretch wrapping, particularly for wrapping of foods. Its features include various excellent characteristics such as mechanical strength, transparency, heat resistance, sealability, stretchability, low temperature resistance, etc. In particular, the present invention concerns a process for producing such a multilayer film by cold stretching a multilayer containing at least one layer with a specific composition capable of a high degree of cold stretching, which enables simultaneously cold stretching of other layers made of resins which can be or cannot be stretched solely, through its cold stretching force, thereby imparting high strength to all the layers, and further applying a specific heat treatment on the stretched film to modify orientation of the film so as to increase stretchability and to stabilize dimension of the film.

16 Claims, No Drawings

HIGHLY-ORIENTED STRETCHABLE MULTILAYER FILM AND PROCESS FOR PRODUCING THE SAME

BACKGROUND OF THE INVENTION

This invention relates to a multilayer type orientation-modified highly stretched film to be provided for use primarily in wrapping material. More particularly, it pertains to a multilayer film excellent in heat resistance, sealability as well as stretchability, comprising a layer structure of at least three layers, with at least one layer containing a specific mixed composition (M layer), a layer comprising at least one polymer selected from crystalline polypropylene and crystalline polybutene-1 (H layer), and a surface layer (S layer), wherein the whole layers are stretched in at least one direction to be highly oriented, followed subsequently by application of a specific heat treatment to modify its orientation.

The film of the invention is useful for various wrapping purposes such as stretch wrapping, stretch-shrink wrapping, shrink wrapping, etc. or otherwise for skin packing, cohesive wrapping or other wrapping or packaging uses. While the invention is not particularly limited in its use, it is particularly suitable for stretch wrapping and stretch-shrink wrapping, and the following description is made primarily by referring to these uses as an embodiment of practical applications of the present invention.

Packages formed with films are manufactured by a good number of methods which utilize to advantage the characteristics of the films such as the bag sealing method, twist wrapping method, thermal shrink wrapping method, cohesive wrapping method by use of specific films represented by Saran Wrap (product by Asahi Kasei Kogyo K.K.), stretch wrapping method, skin packing method, etc. These methods require respective wrapping characteristics. For each packaging method, therefore, it is generally practiced under the present situation to select a film whose basic material, composition, form and characteristic attributes best suit the wrapping characteristics of the particular method employed.

The shrink wrapping method, on the principle of full use of the heat shrink property of a film which has been stretched to acquire a specifically set orientation, comprises the steps of loosely pre-wrapping and sealing a given article subjected to wrapping so as to enclose the article with the film and, thereafter exposing the film to a heat medium such as a current of hot air, an infrared ray, or hot water and the like, thereby causing the film to shrink and come into tight contact with the overall contour of the article. This method is characterized by the fact that the produced package has a beautiful appearance which adds to the commodity value of the wrapped article. In addition, the package keeps the contents hygienic, permits shoppers to touch and usually examine the quality of the contents, keeps the contents tightly in position regardless of shape or whether there are a plurality of pieces in one package, and provides the content with ample protection against vibrations and impacts. Compared with the stretched wrapping method which is used extensively in supermarkets, the shrink wrapping method provides high speed wrapping of the article. Also, this method permits the wrapping of an article with a complicated shape which cannot be wrapped by the stretch wrapping method and also, the wrapping of an article without a vessel such as a tray. While there is another advantage enabling tighter wrapping, there is involved the disadvantage that the film must be heated sufficiently until the film is shrunk. On the other hand, the shrink films generally employed in the art are not suited for the purpose of stretch wrapping because of drawbacks such as small elongation of the film itself, breaking of the film when overly stretched, too strong a stress relative elongation to effect elongation easily and substantial absence of self-stickiness. These are the drawbacks and problems of the shrink films of the prior art.

On the other hand, as is well known, stretch wrapping has been popularly employed in recent years in super markets for wrapping vegetables, fruits, fresh feedstuffs, meat and various cooked foods. The advantages are that is it high in fitness capable of responding to uneven shapes or sizes of the article to be wrapped without causing the film to have residual permanent deformation or creases when stretching the readily elongated film. Also, the film can be easily fixed by light pressure or heat setting of the drawn film without sagging of the packages. In addition, it has an appropriate air permeability for fresh foods thereby preserving freshness and preventing a reduction in weight of the article to be wrapped. Furthermore it can keep the article to be wrapped hygienic and permits shoppers to confirm the quality by vision and touch. The wrapped article is also beautiful in appearance thereby adding greatly to the commodity value of the article to be wrapped. Both the inexpensive manual wrapping machine and the highly efficient automatic machine are easily available and no heat is given to the article to be wrapped.

In the prior art, however because of employing an unstretched film having a high elongation of the film, there are involved numerous problems. The mechanical strength of the film is low resulting in frequent breaking of the film or formation of holes when sealing the folded films at the bottom of a tray. The operability (mechanical suitability, manual workability) is poor due to a low modulus of the film, whereby the film cannot be made extremely thin in view of its quality, and thus thick films must be used.

Heretofore, with an aim to develop a film having properties equal to or better than those of the plasiticized polyvinyl chloride film (containing 30 to 33 wt. % of plasticizer), various manufactures have developed films comprising various resins (e.g. EVA; ethylene-vinyl acetate copolymer, 1,2-polybutadiene resin, L-LDPE:linear LDPE, etc.), which are substantially unoriented films consisting of other kinds of resins, to challenge the market. However, under the present situation, none of these attempts are considered to be successful. Further, while development of a complete film other than plasticized polyvinyl chloride film is rapidly desirable because of the problems in pollution and hygiene at the present time, only an insufficient film which is poor in handling is now being used as a trial. Such a film cannot be handled with ease and is therefore not welcomed at the working site of wrapping. The amount of such a film employed is very small and far from providing a substitute for the polyvinyl chloride film. These films are those of high quality to be utilized primarily for foods, as distinguished from those films having low levels of the requisite characteristics to be generally utilized for industrial applications, such as pallet stretch film.

The manufacture of a drawn film of polypropylene on the other hand, is accomplished by a method comprising the steps of melt extruding the polymer resin through an extruder die, quenching the extruded tubular sheet, reheating the cooled tubular sheet at a high temperature within the range of e.g. from 150° to 160° C., and forcing air into the inner cavity of the tubular sheet. In the case of a drawn film of low-density polyethylene, a similarly extruded tubular sheet of the polymer resin is biaxially drawn in an effort to set a high degree of molecular orientation in the film. In the course of the drawing, however, the sheet bursts, making a manufacture of film hardly practicable from the technical point of view.

Because of the above mentioned difficulty, the generally method is a direct inflation method which comprises the steps of extruding the polymer resin at a temperature within the range of from 180° to 220° C., for example, and subsequently causing the extruded sheet, by means of a proper form of air, to be simultaneously cooled and inflated to a prescribed size.

While this method is characterized by producing a film easily at low cost, it is impossible to set satisfactory molecular orientation by stretching, because flowing will readily occur between molecules. Also, the optical properties are very inferior. Accordingly, for use in shrink wrapping, the resultant film has low heat shrink percentage, low heat shrink stress and shrinks at rather high temperatures. Therefore, such a film can be used only in special uses with increased film thickness. For the purpose of improving the above drawbacks, it has been proposed to prepare a film of low density polyethylene according to the steps of extruding a film of low density polyethylene, irradiating the resultant film with a high energy radiation to effect partial crosslinking thereof, stretching the film by heating to a high temperature (e.g. 140° C.) in excess of the melting point, whereby flowing between molecules can be prevented to sufficiently set molecular orientation. However, the extent of low temperature shrinkability, which is one of the most important characteristics in the shrink packaging method, is low and the film obtained readily bursts with small elongation. The film produced according to this process is small in elongation and too high in stress on elongation to 100 or 200% (frequently not elongated to such percentages). Therefore, it is a film which cannot entirely be utilized for stretch wrapping film, and is only utilized in a part of shrink wrapping as a film shrinkable at high temperature.

As a new category of wrapping films, a variety of composite multilayer films have been known.

Recently, to meet the demand of higher requisite characteristics, composite (multilayer) films have been increasingly developed. For example, there exist generally a large number of composite films having other resins laminated by melting on unoriented films or oriented films.

For example, various kinds of films and combinations are chosen depending on uses, such as a film improved in heat sealing property by fusion lamination of other resins on an unoriented polypropylene according to the casting method (called as C.PP) or an oriented propylene (O.PP) or a film improved in barrier performance prepared by coating with a polyvinylidene chloride type latex (called as K coat film), etc.

On the other hand, it has also generally been known in the art to produce a co-extruded film of unoriented type by melting various kinds of resins separately in respective extruders, permitting the molten resins to be confluent within a multilayer die to be combined and extruded therethrough, followed by cooling, into films and sheets.

However, in the case of a stretched multilayer film, in the first place, each layer constituting the multilayer product differs in optimum extruding conditions, stretching conditions, etc. depending on the resin employed, even if it is desired to obtain a film stretched to a high degree. According to the technique of the prior art, unfavorable phenomena occur such as uneven thickness, vertical streak, puncture, bursting, peel-off of respective layers and whitening due to interface roughening occurred, whereby no satisfactory product can be obtained. Also, even when a small piece of the film may be obtained, such a product is far from the film having intended characteristics under the present situation. It has been deemed to be very difficult to solve these drawbacks. Moreover, it has been deemed to be entirely impossible to use an oriented film as a stretchable film which requires stretchability and no such thought has ever been conceived. The present inventors have invented U.S. Pat. Nos. 4,277,578, 4,399,181 and 4,430,378 to overcome the drawbacks of the shrink films as described above. The films proposed by these patents are more suited for uses of shrink wrapping. Further, as a film more suited for uses of stretch-shrink wrapping, the present inventors have invented a film as disclosed in Japanese laid-open Patent Publication No. 175,635/1983. But that film was found to be yet unsatisfactory as a complete stretch film, with respect to its stress balance relative to elongation and also elongation as a whole. Thus, in some cases, it has been frequently utilized primarily with respect to its low temperature shrinkable properties acquired from the cold stretching method, secondarily with less stress imposed on elongation. In other words, the film was utilized as a film having more excellent elongation and low temperature shrinkability as compared with the films of other methods. The present invention has achieved a still more excellent invention which satisfies sufficiently the properties deficient in these inventions and also enlarged its uses. This will be clarified in more detail by comparison with Comparative examples as hereinafter described.

As a more detailed description of the stretch wrapping method, the films to be used commercially for these methods of the prior art are only films made of materials containing a large amount of plasticizers, such as soft polyvinyl chloride resins containing as much as 30 wt. % or more of plasticizers (hereinafter abbreviated as PVC). These films cannot be extruded or endowed with a flexible property to be unsuitable for this kind of use (stretch), unless a large amount of a plasticizer is mixed therein. Thus, since a larger amount of a plasticizer, for example, dioctylphthalate, dioctyladipate, etc. is employed, there are involved various problems such that the amount of water vapor permeated through the films is increased to readily cause denaturation of the article to be wrapped. Moreover the plasticizer is liable to migrate to the article to be wrapped and cause contamination thereof. Cutting of the film by hot wire during wrapping working will cause generation of the gas of the plasticizer and corrosive chlorine type gas which are undesirable from viewpoint of hygiene; and toxic gases are generated during incineration of the used films. Finally, the film is inferior in cold resistance and is less pliable, brittle, liable to burst during storage of the wrapped product at low temperatures and the film roll is heavy.

Whereas films constituted only of high density polyethylenes, low density polyethylenes or polypropylene polymers among polyolefins for general purpose have excellent properties with respect to the drawbacks in pollution as described above, they are devoid of important properties necessary for uses as intended by the present invention. Thus, it has been difficult to provide a practical film for stretch wrapping capable of satisfying the various characteristics as mentioned below with the use of these films. More specifically, the film to be used for stretch wrapping must, at the same time, satisfy all the characteristics as mentioned below. Thus the films must have:

(a) adequate stress relative to an adequate elongation, and also a high elongation at break;

(b) excellent film-to-film adhesion;

(c) adequate delayed recovery characteristic, high deformation recovery, an adequate elastic elongation, and strong in mechanical strength;

(d) adequate slipping characteristic at the surface of a film;

(e) excellent optical characteristics such as transparency and gloss;

(f) adequate gas permeability;

(g) excellent anti-fogging property without retention of water droplets on the surface;

(h) excellent wrapping operability; and (i) heat resistance during sealing.

For example, when an unoriented film of polypropylene is first drawn for stretch wrapping, only a certain portion is elongated, whereby the phenomenon called necking occurs with generation of extreme thickness irregularity. Even after removal of the load, the portion remains in the state as drawn, whereby the wrapped product is greatly damaged in appearance and the intended purpose of wrapping is not achieved. Also, the stretched film is hard, strong and small in elongation, requiring a very great force for elongation up to the point at which the article to be wrapped is broken. Such a film has no tackiness and, even if a plasticizer such as a liquid polybutene or a polybutene with low polymerization degree may be mixed therein, no tackiness can be imparted thereto, unless it is used in an amount of 5 wt. % or higher. If employed in such an amount, since polyolefins lack the ability of retaining plasticizers as possessed by polyvinyl chloride resins, most of the plasticizers will bleed out on the surface to make the film sticky and practically unuseful.

High density polyethylene films are also similarly hard and cannot easily be stretched to give similar results. In fact, they are opaque without luster, thus having no possibility of application.

Low density polyethylene films are relatively softer as compared with those as mentioned above, but non-stretched films suffer also from necking, with the deformation recovery being small, having lower strength, no good transparency and no tackiness. Thus, they are not useful for the purpose of the invention. On the other hand, low density polyethylene films crosslinked with, for example, an electron beam so as to be made readily stretchable, and stretched according to a conventional method, have the same drawbacks as polypropylene, and therefore they also are not provided with properties suitable as the base material for stretch wrapping, as intended by the prevent invention.

In the case of an elastic elastomer having substantially complete deformation recovery comprising a base material such as styrene-butadiene latex or other rubbers, although there is no such phenomenon as necking, there is a problem with respect to optical characteristics and hygiene of foods. In addition, the strength when elongated is approximately in direct proportion to the elongation and the response of relaxation of deformation recovery is effected momentarily. That is the film will be restored to its original state momentarily when it is released in setting the film end portion at the article to be wrapped or at the bottom portion of a tray, whereby the wrapping will be loosened. Thus, this kind of material does not have the desired properties suitable for one of uses intended by the present invention.

Of these polyolefin type films, there are also commercially sold trial samples comprising mainly crystalline 1,2-polybutadiene type or ethylene-vinyl acetate copolymer (EVA), admixed with an anti-fogging agent, tackfier, etc., formed into films in a conventional manner (T-die method, air-cooling inflation method, etc.). However, these films have a number of drawbacks and have not yet commercially been sold in full-scale without reaching the level as substitute for films of the prior art.

The above films cannot eliminate at the same time all of the properties antagonistic to each other such as easy elongation during packaging, heat resistance at the sealed portion, easy sealing, and, further, prevention of bursting during packaging due to deficiency in film strength. Thus, the films consequently have only average and incomplete properties. For example, in the case of an EVA type film, when the content of vinyl acetate (VAc) in EVA is increased, the film turned around the bottom portion of a vessel will tend to be molten by heat and burst readily. For this reason, in order to prevent such a tendency, the thickness of the film must be increased from $16\mu$ to $20\mu$, or $22\mu$ or $24\mu$. As a consequence, drawbacks occur such that the film becomes hardly elongatable, the films become less sticky before sealing due to the rubbery elastic components and the increased film thickness makes sealing more difficult. Moreover, there is also involved the problem of disadvantageous increase of cost. Then, as a next measure, there is adopted the method of incorporating, for example, a low density polyethylene (particularly of the linear type), a polypropylene or a rubber into EVA. By such a method, however, no great extent of improvement can be brought about. On the contrary there is the tendency that important characteristics such as transparency, gloss, etc. may be lowered to further pose additional problems.

SUMMARY OF THE INVENTION

The present inventors have studied to further improve the drawbacks of these films and preparation methods, and consequently found a film having effective stretchability and being improved to a great extent also in additive properties such as heat shrinkage at low temperature, broadness in dependency on temperature of heat shrinkage characteristic, optical properties, low vapor permeability, sealability of the film, tensile strength and elongation at break, and low temperature flexibility. The film is not inferior to plasticized PVC films but is more excellent in various characteristics. The film is also improved due to a specific process for the preparation thereof which is not expensive and excellent in processability.

More specifically, the present inventors have accomplished a novel film and a process for the preparation thereof by arranging specific layers and forming them into a film by treatment under specific processing conditions, whereby a film not found in the art having eliminated the various defects as described above at the same time, which is suitable widely for various kinds of wrapping methods, particularly as stretch wrapping film, can be obtained. In other words, the present invention concerns a composite film and its specific feature resides in provision of layers comprising specific mixed compositions or components further in combination with other specific layers as well as the processing of cold stretching under specific conditions, whereby a high degree of stretched orientation and other excellent characteristics not found in the prior art can be exhibited through the synergistic effect of said mixed compositions or components with the layer of other kinds of resins, and further the orientation can be modified by application of a specific heat treatment. For example, through the synergistic effect of its treatment effect and the composition, without lowering significantly the tensile strength of the S—S curve, the stress at the middle portion, namely the portion necessary for stretch wrapping, can be lowered to be more easily elongated. In particular, under the conditions which cannot stretch in case of an individual layer, various characteristics, particularly high degree of stretched orientation can be imparted very stably to respective layers, whereby a multi-layer film particularly excellent in various characteristics such as elongtion, strength, transparency, etc. can be obtained. The film of the present invention is not limited to the film for stretch wrapping but useful as films for various kinds of stretching. As another application, it can also provide a film having good properties such as a shrink film, particularly a film excellent in optical characteristics, strength, heat seal characteristic, elongation, stress relaxation characteristic as well as low temperature shrinkage characteristic, shrinkage response (speed), etc. As still another application, it is a film suitable for stretch-shrink wrapping.

More particularly, the present invention concerns a multilayer oriented film excellent in sealability and stretchability, having high strength and high elongation, which comprises at least three layers of:

(1) a base layer (M layer) containing primarily a specific mixed composition selected from the group of polymer compositions consisting of (A)+(B)+(C), (A)+(B) and (B)+(C), (A) being at least one polymer selected from a low density polyethylene, or a copolymer of ethylene with a monomer selected from a vinyl ester monomer, an aliphatic unsaturated mono-carboxylic acid or an alkyl ester of said mono-carboxylic acid the derivatives of said copolymer;

(B) being a soft elastomer having a Vicat softening point of 60° C. or lower;

(C) being at least one polymer selected from crystalline polypropylenes and crystalline polybutenes-1, at least one such M layer being provided adjacent to the core layer as defined below, (2) a core layer (H layer) as inside layer comprising primarily a polymer selected from (C); and (3) a surface layer (S layer) containing at least one polymer selected from said polymer (A), soft elastomer (B), crystalline 1,2-polybutadiene or a soft ionomer resin from an ethylenic copolymer, .

said film having a stress on 100% elongation of from 100 to 600 (g/cm-width) on an average value in the longitudinal and transverse directions.

DETAILED DESCRIPTION OF THE INVENTION

The base layer (M layer) comprises specifically a mixed composition of (A) and (B), (B) and (C), or (A), (B) and (C), wherein (A) is at least one polymer selected from a low density polyethylene, or a copolymer of ethylene with a monomer slected from a vinyl ester monomer, an aliphatic unsaturated mono-carboxylic acid or an alkyl ester of said mono-carboxylic acid the derivatives of said copolymer; (B) is a soft elastomer having a Vicat softening point of 60° C. or lower; and (C) is at least one polymer selected from crystalline polypropylenes and crystalline polybutenes-1. Further, said composition may also contain a composition comprising primarily a component subjected to energy ray treatment, having an insoluble gel in boiling xylene of 0 to 50 wt. % and a melt index of 1.0 or less. In the prior art, for improvement of various kinds of characteristics of a crystalline polypropylene (hereinafter abbreviated as IPP), particularly heat stability, strength at low temperature and impact resistance, it has been proposed to prepare a composition comprising primarily IPP, which is mixed partially with an ethylene-propylene copolymer (hereinafter abbreviated as EPR), as disclosed in Japanese Patent Publication No. 7088, Japanese Patent Publication No. 15042/1961 and Japanese Laid-open Patent Publication No. 78977/1977. However, according to these methods, compatability between IPP and EPR is not necessarily good, and therefore, when worked into a thin film, the surface of the film was roughened and thereby worsened greatly in optical characteristics and its strength was insufficient. It has also been proposed, in order to improve such drawbacks even to a small extent, to further mix an atactic polypropylene into the composition, as disclosed in Japanese Laid-open Patent Publication Nos. 112946/1974 and 96638/1973. Each of these improvements is based primarily on IPP, but the problems still remain with respect to kneading dispersibility, strength, heat resistance, sealability, etc., when the composition is formed into a thin film.

The components of a specific composition to be used in the present invention synergistically improve heat sealability, various strength characteristics, flexibility, transparency, tensile modulus, heat durability, cold durability, adhesion to other layers, etc. They cannot only be controlled to give a film which ranges from a relatively soft film to a rigid film, but they also enable cold stretching of the other resin layer, which cannot be stretched at all as a single layer, under the conditions of the present invention during working of the film, thus providing synergistic improvement and a particularly excellent film.

The composition (A) employed here for the base layer or other layers should preferably be a moderately soft polymer with relatively low crystallinity (20 to 65% of crystallinity according to the X-ray method), which is at least one polymer selected from LDPE (preferably a linear low density polyethylene), or a copolymer of ethylene with vinyl ester monomers, aliphatic unsaturated mono-carboxyic acids or derivatives of said copolymer. These copolymers include preferably ethylene-vinyl acetate copolymer (EVA), ethylene-ethyl acrylate copolymer (EEA), ethylene-methyl methacrylate copolymer (EMMA), ethylene-acrylic acid copolymer (EAA), ethylenemethacrylic acid copolmer (EMA) or these copolymers of which at least a part of the polymer having carboxyl groups saponified at least partially is converted into an ionomer (ionomer resins), and the content of the monomers other than ethylene should preferably be 2 to 12 mole %, more preferably 3 to 10 mole %. If the content is 2% or higher, sealability, flexibility, transparency and various strength characteristics become excellent. At a level higher than 12 mole %, extrusion moldability, mixing with other components or heat resistance may become inferior, or when the copolymer is provided as the surface layer to be an outer layer, blocking may occur between the surfaces, whereby a problem with respect to handling tends to arise. The resin selected from these starting materials and used as such may have a melt index generally of 0.2 to 10, preferably 0.3 to 5. With a melt index less than 0.2, there are problems with respect to mixing and extrudability of the starting material. On the other hand, above the upper limit, the various strengths may sometimes be insufficient. For example, during stretching, there may occur unfavorable phenomenon such that the bubble may readily be broken. Among them, the most preferable material to be used for the mixed composition layer (base layer) is EVA, with the vinyl acetate content (hereinafter abbreviated as VAC) being preferably 3 to 8 mole %, more preferably 3 to 7 mole %. The linear low density polyethylene (L-LDPE) refers to a linear low density polyethylene obtained by the medium pressure, low pressure or, in some cases, high pressure method. Particularly, it contains as the α-olefin 7 mole % or less, preferably 1 to 5 mole %, of at least one member selected from α-olefins having $C_3$-$C_{12}$ carbon atoms such as propylene, butene, pentene, hexene, heptene, octene, 4-methyl-1-pentene, etc., copolymerized therein. Otherwise, it may also be one containing a monomer having a polar functional group such as vinyl ester (e.g. vinyl acetate) copolymerized therein. They should preferably have a melt index (abbreviated as MI) of 0.2 to 10 and a density of 0.910 to 0.935 g/cm$^3$. They should also have a crystal melting point (m.p.) within the range of from 110° to 125° C. according to the DSC method (measured at a scan speed of 10° C./min.), and are distinguished from the branched low density polyethylenes having densities of 0.915 to 0.925 g/cm$^3$ and crystal melting points of 100° to 108° C.

Referring next to the soft elastomer having a Vicat softening point of 60° C. of the component (B), the component includes ethylene-α-olefin copolymer elastomer, butyl rubber elastomer and styrene-butadiene elastomer (particularly thermoplastic block copolymer), etc. Preferably, it is a thermoplastic elastomer comprising ethylene and an α-olefin, which is a copolymer of ethylene and at least one α-olefin selected from α-olefins having 3 to 12 carbon atoms, which copolymer may also contain a small amount of a hydrocarbon having a polyene structure such as dicyclopentadiene, 1,4-hexadiene, ethylidenenorbornene or others copolymerized therein. Examples of α-olefin are propylene, butene-1, hexene-1, heptene-1, 4-methyl-1-pentene, octene-1, etc., preferably propylene and butene-1. The content of ethylene in the copolymer may be 20 to 95 mole %, preferably 40 to 93 mole %, more preferably 65 to 90 mole %. Further preferably, it is 75 to 85 mole %.

With respect to the properties of these polymers, they should have a density of 0.910 g/cm$^3$ or lower. When they are to be used as the mixed composition base layer, they should preferably have a Vicat softening point [ASTM D1525 (value under load of 1 Kg)] of 60° C. or lower, more preferably 50° C. or lower, including generally from those substantially amorphous at the rubbery region to partially crystalline polymers of low crystallinity of about 30% according to the X-ray method or partially crosslinked polymers. Preferable is the case of a copolymer of ethylene with propylene or butene-1, which may further contain a small amount of a compound having a diene structure as the comonomer. For example, there may be included thermoplastic elastomers such as random copolymers polymerized with a catalyst system of a vanadium compound and an organic aluminum compound, having a melt index of 0.1 to 10, preferably 0.2 to 6. These are preferably supplied according to conventional handling in the form of pellets, as different from non-vulcanized rubber in general having a shape of a block, and yet free from cold flow, and should preferably have sufficient thermoplasticity capable of being extrusion molded simply by extruding a blend prepared by dry blending. These are more preferable than the elastomers referred to as EPM or EPDM which are produced and commercially available generally in the form of a great block with its viscosity being expressed by Mooney viscosity, from which a mass is cut off, thoroughly kneaded with other thermoplastic polymers in a bambury mixer and cut into pellets. They can also be modified by effecting a small amount of crosslinking. Also, a monomer having a polar functional group (e.g. carbocylic acid) may also be added for modification of these elastomers.

The polymer (C) comprises a component which is relatively rigid and has a relatively high crystallinity, and refers to at least one selected from crystalline polypropylenes and high molecular weight polybutene-1 (hereinafter abbreviated as IPP and PB-1, respectively). These may preferably comprise relatively rigid polmers having Vicat softening points of 100° C. or higher. IPP, which is one of the polymers (C), refers to a crystalline polypropylene having high isotacticity such as those commercially sold, preferably those containing homopolymers of propylene or copolymers of propylene and 7 mole % lower of other α-olefins such as ethylene, butene-1, etc. Alternatively, they can also be freely mixed.

The polymer (C) has a melt flow rate (hereinafter abbreviated as MFR) of 0.1 to 30, preferably 0.5 to 20, more preferably 0.7 to 15. If the melt flow rate is less than 0.1, problems may occur in mixing during processing or a haze may result in the resultant film. With a melt flow rate higher than the upper limit, problems may occur with respect to extrusion stability and stability at the sealed portion.

Polybutene-1 should preferably have a crystalline structure with a high molecular weight containing 93 mole % or more of butene-1, which may also include copolymers with other monomers, with a melt index of 0.2 to 10, for the same reason as described above, as different from liquid or waxy polymers of low molecular weight. It is also preferred to use a mixture of IPP and PB-1 as described above. Also, in addition to those, if there is a rigid polymer suited for the object of the invention having adequate compatibility and dispersibility, it can also be used in the present invention. When the polymer (C) is used as the H layer as hereinafter described, it may be used as a mixture with up to 50 wt. % of other polymers [also at least one selected from the polymer (A) and the polymer (B) as described above].

The base layer comprising the specific mixed composition or components is constituted of the respective components as describe above, and its combination and mixed amounts consist substantially of (1): (A) and (B), (2): (B) and (C) or (3): (A), (B) and (C), with the ranges of their amounts being preferably:

(1) $0.05 \leq B/(A+B) \leq 0.90$
(2) $0.30 \leq B/(B+C) \leq 0.90$ or
(3) $\quad 0.05 \leq B/(A+B) \leq 0.90 \quad$ and $0.05 \leq C/(A+B) \leq 2.0$, more preferably,
(1) $0.07 \leq B/(A+B) \leq 0.70$
(2) $0.40 \leq B/(B+C) \leq 0.87$ or
(3) $\quad 0.07 \leq B/(A+B) \leq 0.70 \quad$ and $0.07 \leq C/(A+B) \leq 1.0$, further preferably,
(1) $0.10 \leq B/(A+B) \leq 0.50$
(2) $0.50 \leq B/(B+C) \leq 0.85$ or
(3) $\quad 0.10 \leq B/(A+B) \leq 0.50 \quad$ and $0.10 \leq C/(A+B) \leq 0.40$ Here, when the amount of the soft component (B) mixed is too small, in all the cases of (1), (2) and (3), the synergistic effect as a mixture can hardly be exhibited to lower various characteristics. For example, strength of the film, haze value, low temperature characteristics, flexibility, sealability, cold stretching, etc. will become inferior. On the contrary, if it is too much, the film will excessively be softened, whereby heat resistance, seal characteristic and haze value tend to be deteriorated. Also, as shown stepwise in the above formulae, when the range of the component (B) is restricted to narrower ranges, the synergistic effect gradually becomes greater in either case of (1), (2) and (3). For example, strength, haze value, flexibility, sealability and stretchability during drawing of the film will be improved.

Among the respective combinations of the mixed compositions as mentioned above, a particularly preferable combination is one comprising primarily [(A), (B) and (C)] of (3). More preferably as the base layer, 1 to 10 wt. % of at least one additive selected from liquid or paste-like anti-fogging agents and plasticizers are added to these combinations. Further preferably, in addition to these, 1 to 30 wt. % of at least one carrier for holding these additives as hereinafter described is contained in the composition. The same tendency can also be seen in the case of the composition of A+B or B+C.

With respect to the component (C), this component improves tensile strength, impact strength, heat resistance, extrusion moldability, modulus, heat seal range of the mixed composition synergistically with other components, particularly great in effect in heat resistance, extrusion moldability, modulus and heat seal range. If the amount of the component is to small, the effect will be lowered in, for example, workability, heat seal range and improvement of strength of the film. Also, the expected value of heat resistance will be lowered. If it is too much, extrusion moldability, transparency, flexibility and impact strength will be undesirably deteriorated. Therefore, the above range is preferred. Here, the component (A) may preferably comprise a specific ethylenic copolymer selected from those as described above, and it is sometimes preferred to constitute the main component in the mixture of the three components of (A), (B) and (C).

Of the three components, the component (A) and the component (C) cannot usually be mixed well with poor compatibility, and the synergistic effect described above cannot be expected for such a mixture. But the drawback of such a mixture can be markedly improved by addition of the component (B).

This may be considered to be due to complicated synergistic actions such as the severe interaction between the characteristics derived from the structure related to ethylene and the polar functional group contained in the component (A), the crystalline structure of the mixture and the dispersed state of the mixture, the effect of the treatment, etc.

For example, in the case of the component (A) as the main component, when the respective components as described above are dry blended in pellets and extruded by fusion kneading through an extruder excellent in kneading ability into a raw film, it is possible to conceive a state where the component (B) is dispersed complicatedly internally of the component (C) dispersed in the component (A) or in the vicinity thereof, while undergoing reaction or interaction with these components.

These can give different shapes depending on the molding conditions, when a flow orientation is given by processing of a film-shaped molding.

For example, when the above mixture is extruded through a small slit, for example a die for film or sheet having a 1.5 mm thickness, it can be extruded as such or with application of a certain draw ratio and quenched to form a film. In the case of, for example, mixing 20 wt. % of PP, some portions of the component (C) and PP were oriented in the direction flowing through main component, with the dispersed particles oriented in fibrous state, although such an effect may differ depending on the rigid component (C) employed and its amount. In some cases, the structure may become as if reinforced with glass fibers to exhibit various extremely improved characteristics such as strength.

The component (C), which can also be dispersed in a flat shape depending on the working conditions to elongate the path length, may be considered to have a barrier performance against the aforesaid additives (anti-fogging agent, plasticizer), thereby having the action of prolonging the effect of such additives by controlling bleed-out onto the surface or the action of enhancing the retaining effect.

On the other hand, in the case of (B)+(C), the thermoplastic elastomer (B) particularly preferably used is an amorphous or a partially low crystalline random copolymer of 65 to 95 mole %, preferably 75 to 90 mole %, of ethylene with at least one α-olefin selected from propylene and butene-1, which copolymer is supplied in pellets and used by dry blending. The base layer may also be used so that the aforesaid mixed polymer may exist in an amount of at least 50 wt. %, preferably 80 wt. % or more, within the range which does not impair various characteristics. Also, the base layer contains other resins mixed therein.

The specific mixed composition of the components to be employed for the special multilayered film of the present invention may be subjected to, after extrusion into a multilayer to provide a raw film, activation treatment with a high energy ray, such as electron beam (β-ray), γ-ray, or UV-ray for modification of the polymer by effecting a crosslinking reaction. The extent of the "crosslinking reaction" may be from 0 to 50 wt. % of insoluble gels in boiling xylene and 1.0 of melt index, preferably from 0.1 to 40 wt. % of the same gels with a melt index of 0.5 or less, more preferably from 0.5 to 30 wt. % of the same gels with a melt index of 0.1 or less, further preferably from 1 to 25 wt. % of the same gels with a melt index of 0.1 or less, still further peferably from 1 to 20 wt. % of the same gels with a melt index of 0.1 or less.

If the insoluble gels are greater in amount than the range as specified above, the molded product will be deteriorated in elongation, strength, etc. In particularly, there ensue problems when molded into films such that the film cannot be sealed, the film cannot be cut with hot wire, the film is readily broken, etc. Thus, the range as specified above is preferred. The amount of the insoluble gels was shown stepwise in the above description, and the balance of the characteristics such as sealability, heat resistance, stretching, etc. can be improved as the range for the above amount becomes narrower.

Next, as another layer of the present invention, the H layer comprising the polymer (C) comprises primarily a homopolymer or a mixed polymer selected from the crystalline polypropylene (IPP) and the crystalline polybutene-1 (PB-1) as described above, preferably the latter mixed polymer. In addition to the above, a mixture containing 50 wt. % or lower, preferably 40 wt. % or lower, more preferably 30 wt. % or lower, of other polymers having a lower Vicat softening point than IPP with the above polymer may be used. In such a case, the H layer should conveniently be made of a constitution with a composition having better heat resistance than the other layers. Heat resistance is a property possessed by the resin itself or the mixed composition and a value expressed as the synergistic effect with other layers during measurement in the use as hereinafter described.

Next, referring to another layer of the invention, namely the surface layer (S layer) having good sealing characteristic, transparency and gloss, it comprises at least one polymer selected from the above component (A), the component (B) and other components as hereinafter described. They can be selected, preferably from linear low density polyethylene (L-LDPE) as described above, or ethylene-vinyl acetate copolymer (EVA), ethylene-acrylic acid copolymer (EAA), ethylene-acrylic acid ester copolymer (EEA), or a resin having at least a part of the product saponified in at least a part of ethylene-acrylic acid ester and ethylene-methacrylic acid ester ionically crosslinked (Io), ethylene-α-olefin copolymer (preferably ethylene-butene-1 random thermoplastic elastomer), crystalline 1,2-polybutadiene, etc.

In the case of L-LDPE, its preferable melt index is from 0.2 to 10, and its density from 0.910 to 0.936 g/cm$^3$, more preferably the melt index is from 0.2 to 8 and the density from 0.910 to 0.925 g/cm$^3$. Further preferably, the melt index is 0.2 to 6. The lower limit of the melt index is due to the limit in extrudability into a film, while the upper is due to instability in cold stretching of the aforesaid main (base) layer brought about when utilized as the surface layer, or insufficient seal strength at the sealed portion or insufficient resulting strength. The lower limit of density comes from the restriction in preparation of the resin, while the upper limit is due to instability of stretchability during drawing similarly as in the case of the upper limit of the melt index as mentioned above and worsening of haze value or gloss of the film, particularly after shrinkage. Within the above ranges, without worsening workability and various characteristics or inhibiting various characteristics of other layers, particularly the base layer, but contrariwise through the synergistic effect with other layers, these various factors were found to be markedly improved. In particular, as to the characteristics, various strength characteristics, sealing characteristic and high temperature oil resistance characteristics can be markedly improved. It is also preferred to use a polymer having a peak value of 110° to 125° C. of the crystal melting point (m.p.) as measured by the DSC method (temperature elevation speed: 10° C./min.). The partner of the comonomer should preferably be selected from octene-1, 4-methyl-1-penetene and hexene-1. The linear low density polyethylene of the main component may also contain other polymers mixed therein, provided that the various characteristics as described above are not impaired thereby, with the limit of other components mixed being 50 wt. %, preferably 40 wt. %, more preferably 30 wt. %.

Next, in the case of an ethylene-vinyl acetate copolymer (EVA), the content of vinyl acetate is 3 to 10 mole %, preferably 3 to 7.5 mole %, more preferably 3.5 to 6 mole %, and its melt index preferably 0.2 to 5, more preferably 0.5 to 3, further preferably 0.5 to 2.0. The same is the case with respect to other aliphatic unsaturated monomer type copolymers. Also, in the case of the ethylene-α-olefin copolymer, a preferable copolymer is an ethylene-butene-1 random thermoplastic elastomer. In this case, MI is 0.5 to 25. On the other hand, in the case of the crystalline 1,2-polybutadiene polymer, it is thermoplastic, has a crystallinity of 10 to 35% and a melt flow index (150° C.) of 1 to 10.

Among them, EVA is preferred and it is also possible to use other kinds of resins mixed therein within the range which will not impair the characteristics such as the sealing characteristic, haze value or improvement of gloss, intended by the present layer, particularly the characteristics exhibited through the synergistic effect with other layers against worsening of haze value or gloss asfter shrinkage. More specifically, its amount may be 50 wt. % or less, preferably 40 wt. % or less, more preferably 30 wt. % or less.

Either one or both of the skin layer and the base layer may employ suitable additives (organic or inorganic) such as erucic acid amide, oleic acid amide, stearic acid amide, bisamides of these and others as the slipping agent, either singly or as mixtures. The content thereof may range from 0.1 to 0.7 wt. %, more preferably from 0.2 to 0.5 wt. %. Otherwise, singly or in addition to the above additive, it is also preferred to use, as the anti-fogging agent, polyalcoholic esters of fatty acids, nonionic surfactants of olyoxyethylene alkyl phenyl ether and other effective ones. Typical examples may include polyglycerine monoesters or diesters of oleic acid, stearic acid or lauric acid, sorbitane monolaurate, polyoxyethylene alkyl phenyl ether, monoleic acid glyceride, alkyl alkylolamide, polyoxyethylene monooleate, polyoxyethylene monostearate and the like. These can be used generally in an amount of 0.3 to 5 wt. %.

It is also possible to add a small amount of a mineral oil as the plasticizer to the above layer. Its preferred range is about 0.5 to 5 wt. %. Further, if necessary, as the tackfier (abbreviated as P agent), for example, alicyclic saturted hydrocarbon resin, ester gums, rosins, petroleum resins and terpene resins may be added to the above layer. Its preferable range is 0.5 to 7 wt. %, more preferably 1 to 5 wt. %. These various additives may be used as desired depending on the purpose either singly or in a mixture, and the total amount used may be approximately 0.5 to 15 wt. %, preferably 1 to 10 wt. %.

The above additives, in order to exhibit further their effects, may also be added not only in the skin layer but also in the aforesaid base layer. In that case, in addition to the increased effect as compared with the case where the respective additives are added only in the S layer, bleed-out to the surface through the S layer, the bleed-out speed can be controlled by the base layer as described above, whereby there are additional effects such as the initial effect of anti-fogging characteristic and synergistic effect capable of exhibiting retentivity of the effect due to water resistance with lapse of time. Also, as compared with the case of employing these additives for a mono-layer film, for a reason not clarified, staining phenomenon on the surface is particularly small. This is one of the unexpected effects.

Further, by incorporating in at least the base layer of the above layers, 1 to 30 wt. %, preferably 3 to 20 wt. %, more preferably 5 to 15 wt. % of at least one carrier (AS agent), which is selected from alicyclic saturated hydrocarbon resins, ester gums, rosins, petroleum resins, terpene resins, atactic polypropylene (APP), 1,2-PB, EVA with high VAc, oligomers or others and can retain the above plasticizer and permit the anti-fogging agent to bleed out gradually, a particularly excellent synergistic effect as mentioned below can be exhibited. That is, the AS agent does not permit an anti-fogging agent to bleed out within a short time, but effectively retains by permitting it to bleed onto the surface gradually, with the result that stickiness or staining on the surface will hardly be generated. With a balance in amounts of anti-fogging agent, plasticizer and AS agent, the antagonistic requirements of plasticizing effect and nerve hardness can be accomplished. This is very convenient for a film. It is surprising enough that good anti-fogging property, slipping property and wrapping property can be obtained in a thin film of about 5 to 10μ. As an additional effect, processability of the film, particularly cold stretchability is improved and stabilized (puncture is decreased, etc.). Further, a specific heat treatment can act effectively, whereby elongating stress can readily be lowered (namely readily denatured by partial deorientation, and consequently readily elongated). During stretch wrapping, the denatured portion is cold stretched again in the elongated direction, and the film strength will easily be increased non-linearly together with elongation (whereby wrapping becomes easier). Such interesting effects can be exhibited by incorporation of the AS agent. This effect may also be utilized for other layers, particularly the skin layer, but in most cases sufficient effect can be obtained by incorporation of the AS agent only in the base layer.

With respect to the thicknesse of the respective layers, the proportion of the base layer (M layer) within the total layer thickness should preferably be 20 to 90%, more preferably 30 to 85%, further preferably 50 to 80%. The lower limit of the above range is the proportion required in order to exhibit the synergistic effect of the present invention by allowing the other resin layer which cannot itself accomplish cold stretching to accomplish the same stretching through the cold stretching force of the base layer, and it is also the thickness necessary to exhibit the various characteristics as mentioned above which are imparted by the composition of the base layer. The ratio of the layer may be determined optimally depending on the purpose of the film. For example, when there is another layer with a composition to which cold stretching can hardly be imparted, the lower limit of the base layer thickness is relatively high. On the contrary, when there is a compostion layer to which cold stretching can readily be imparted, its level may of course be low, when considering only the performance in processing. Actually, however, to have the characteristics of the base layer other than processability (namely cold stretchability) exhibited fully, the thickness may be determined in view of the balance between both of these characteristics. The upper limit in the above range is a ratio to be determined by the effect of other layers utilized, and it can freely be determined depending on the purpose.

The next layer, namely the core layer (H layer) as inside layer comprising predominately the component (C) is higher in modulus than other layers, and it is effective for improvement of the modulus of the film as a whole as well as improvement of dimensional stability and strength. Also, it is effective for improvement of Vicat softening point, and heat resistance as represented by the crystal melting point. All of these characteristics can be exhibited for the first time when overlayed on the base layer and subjected to cold stretching in the present cold stretching method. Otherwise, if there is an appropriate resin having a m.p. of 130° C. or higher, it can also be used. The content of the above component (C) may be 50 wt. % or higher, preferably 60 wt. % or higher, more preferably 70 wt. % or higher. Thus, the present film possesses at the same time the antagonistic properties of the above tensile modulus, low temperature shrinkability and stretchability during packaging. Moreover, the film tensile modulus and dimensional stability are also improved as compared with the above-mentioned prior Patent Application by the present inventors. According to other methods than the present invention, namely the high temperature stretching method, ordinary low stretching method or unstretching method, no such layer as the H layer as described above can be formed to accomplish no object of the present invention, as a matter of course. The thickness of the H layer relative to the total thickness may preferably be 3 to 40%, more preferably 5 to 30%, further preferably 5 to 20%. The lower limit is defined to have the above synergistic effect as the present layer exhibited, while the upper limit is defined to give the synergistic effect with the other layers, i.e., the base layer and the skin layer as well as to give good processability. The above ranges can conveniently be utilized for determining the layer constitution depending on the purpose.

The next layer, namely the surface layer (S layer) may have a proportion of thickness relative to the total layer thickness preferably of 5 to 40%, more preferably of 10 to 40%, further preferably of 15 to 30%. The absolute value of the total thickness may preferably be 0.25 to 20μ, more preferably 0.5 to 10μ. The lower limit of the above range is the minimum thickness necessary to exhibit the effect of the S layer as mentioned above synergistically with respective layers, while the upper limit is necessary for processability and the characteristics of other layers.

Examples of layer constitutions according to the respective compositions as described above include the following combinations, in which the base layer is represented by M, the core layer comprising the composition (C) by H and the surface layer by S:

the case of three layers:
    S/H/M
the case of four layers:

S/M/H/S, S/M/H/M, ...
the case of 5 layers:
S/M/H/M/S, S/H/M/H/S, S/H/M/H/M ...
the case of 6 or more layers:
S/M/H/M/H/S, S/M/H/M/H/M/S,
S/H/M/H/M/H/S, ...

In the above constitutions, the notation .../M/... is not limited to only one layer, but is also inclusive of two or more layers of mixed resin layers with different compositions laminated, for example, as indicated by .../(M)$_1$/(M)$_2$/....

Further, in addition to the above combinations, layers comprising different kinds of resins such as of soft PVC may also be added by appropriate means. Thus, the above examples are not limitative of the invention.

The entire thickness of the film of the present invention may generally be from 3 to 50μ, preferably from 4 to 30μ, more preferably from 5 to 25μ. Particularly, for example, the film for use in stretch wrapping for tray pack or non-tray pack is required to have a very thin thickness of 4 to 20μ, preferably 5 to 15μ, more preferably 6 to 12μ. However, these ranges are not limitative of the invention. The lower limit is thin enough due to particularly higher strength of the film itself which enables working with such a thin thickness, and itself can cope sufficiently with other films because of having higher strength than other films. With a thickness lower than the lower limit, problems will ensue with respect to production and handling. The upper limit can be defined, because the films with such a thickness are sufficiently comparable to other thicker films in production as well as characteristics exhibited. For example, the film of the present invention with a thickness of 6 to 10μ is sufficiently comparable to a soft PVC stretch film of about 18μ in thickness, and yet surprisingly has a number of superiorities thereover.

The film of the present invention, in addition to biaxial stretching, can be stretched approximately monoaxially in either the longitudinal or lateral direction depending on the manner in which cold stetching is performed, but preferably stretched once bi-axially, followed by a change in the degree of orientation in either the longitudinal or transverse direction. This is a novel aspect of the invention not found in the art, which lately or simultaneously modifies the orientation (partial deorientation) to impart elongation, whereby the film is strengthened by imparting cold orientation again depending on the degree of stretching during wrapping. As a result, in addition to the effect of easier wrapping, this is one of the greatest points which can provide a large number of specific features of the invention. These are the results of a novel technique and method. To give additional comments, the heat treatment method in general, for the purpose of improving primarily dimensional stability, adopts the method of heating the film after stretching under tension thereby to promote crystallization and effect fixing, or aims to remove the component of a small amount of strain (dimensional change generated with lapse of time at room temperature) similarly under tension. In contrast, the method of the present invention is different in technology and object. Without recourse to the specific cold stretching method of the present invention, it is difficult to apply these treatments on the films obtained by the high temperature stretching method as described above. Further, with the use of a film according to the unstretched method, the film having the characteristics of the invention can of course hardly be accomplished. As described above, the present invention performs preferably cold stretching at the initial stage. These facts indicate that the present film is excellent also from the standpoint of easier post-treatment.

The film of the present invention has a haze value (ASTM-D1003-52) of 3.0% or lower, preferably 2.0% or lower. For example, in Run No. 1 of Example 1, it is very excellent as 0.3%. This is the value characterized by the preparation method, and excellent transparency can be obtained because working is possible without impairing the properties of the composition quenched, namely the film can be stretched stably in a bubble even at the temperature region lower than the composition constituting the main component, more preferably below its softening point (this cannot be applied, when the film is colored or applied with printing). The low temperature shrinkage as an additional characteristic of the present film other than stretchability during packaging is at least 20% or more at 80° C., and this characteristic can be utilized effectively in the case of the product to be wrapped which cannot be wrapped according to the stretch method alone. This is a matter which did not happen in the film for stretch wrapping of the prior art.

More specifically, a square test strip cut from a film is marked with lines of defined dimensions longitudinally and laterally, and subjected to shrinkage by treating with hot air at a predetermined temperature for 5 minutes with coverage of talc so that no sticking to itself or other matters may occur. The changes in dimensions in the respective directions after heat shrinkage are measured and average values for both longitudinal and lateral directions represent the percentage of heat shrinkage.

The tensile modulus of the film in the present invention is specific in that it can be controlled freely from relatively low tensile modulus to relatively high tensile modulus by changing the constitution of the specific layer (base layer) or the constitution of the H layer or the thicknesses of both, compositions, etc.

Further, the film of the present invention has a particularly strong tensile strength, having a tensile strength at break of at least 4 Kg/mm$^2$ (value measured according to the method of ASTM D882-67), preferably 5 Kg/mm$^2$ or more, more preferably 6 Kg/mm$^2$ or more, in its stronger direction, preferably as mean value in both directions, more preferably in both directions, with its tensile elongation being at least 150% or higher, preferably 200% or more, more preferably 250% or more, in the direction elongatable longer, while at least 100% or more, preferably 150% or more, more preferably 200% or more in the direction perpendicular thereto.

The fact that the film has such a strong tensile strength and large elongation means that the film is tough and difficultly broken, which is very advantageous as the protective film for packages. Thus the film thickness can be saved.

The film of the present invention can have the levels of strength at break (average of longitudinal and lateral directions) of 7.1 Kg/mm$^2$ and elongation of 310% as hereinafter described (Run No. 1). Usually, when the strength is increased by orientation according to the prior art method as described above, elongation tends to be lowered extremely. For example, the film (Control b hereinafter described) of a single material of low density polyethylene which has been sufficiently crosslinked (67 wt. % of insoluble gel in boiling xylene) and sufficiently oriented at high temperature has a strength of 6.9 Kg/mm², with the elongation being very low as 110%, and the sress relative to elongation is too high. As a result, such a film will readily be broken, hardly elongated and therefore stretch wrapping is entirely impossible with such a film.

Stretchability is the most important factor when stretch wrapping by a machine or particularly with hands. First of all, the stress at 100% elongation should be 100 to 600 g/cm-width, preferably 150 to 500 g/cm-width, more preferably 200 to 400 g/cm-width as a practical value represented in terms of a mean value of the longitudinal and transverse direction values. The preferable balance of longitudinal/transverse direction in case of wrapping by drawing transversely is 5/1 to 1/1, more preferably 5/1 to 4/3. Secondly, the stress on 200% stretching should preferably be 200 to 1000 g/cm-width, more preferably 250 to 900 g/cm-width, more preferably 300 to 600 g/cm-width. In the case of wrapping by drawing the film in the transverse direction, the balance ratio of longitudinal/transverse stress should preferably be 5/1 to 1/1, more preferably 5/1 to 4/3. The value in the transverse direction should be 100 to 400 g/cm-width, preferably 150 to 350 g/cm-width, more preferably 200 to 300 g/cm-width. (During measurement, when the film is broken before reaching a certain value due to insufficient elongation, the value is determined by extrapolation).

As viewed from orientation characteristic, the stress on an average (of longitudinal and transverse) on 100% elongation is 1 to 6 Kg/mm², preferably 1.5 to 5.0 Kg/mm², more preferably 2 to 4.0 Kg/mm². Similarly, the stress on 200% elongation is 2 to 10 Kg/mm², more preferably 2.5 to 8.0 Kg/mm², still more preferably 3.0 to 6.0 Kg/mm², and the balance is on the same level as mentioned above.

In other words, since the film according to the present method has a specific layer constitution in which cold stretch is imparted in at least one direction to all the layers, by stretching the film loosely wrapped first on an article to be wrapped during wrapping in the direction with greater elongation, the stress can also extend to the direction perpendicular to the direction to which the stress is applied, whereby the loose portion can be finished tightly and further the orientation of the film is changed to the direction to which stress was applied to result in further improvement of the film. Thus, it has been found that cold stretching orientation is imparted again to the film. This fact reflects the specific feature of the film according to the cold stretch method as compared with the films of other methods, which is high in orientation degree and also great in residual elongation at the same time. As a result, as compared with the prior art, it has been found that stress can be propagated in respective directions, and the film in the direction loosened can be migrated to readily effect packaging of articles with good finishing.

The film of the present invention, due to its specific layer construction, is excellent in handling performance, and also excellent in heat resistance, particularly hole opening resistance by melting at the seal portion during sealing between film surfaces, with the result that the sealing range is broad. Further, for example, when there exist a portion with several films overlapped and a portion of one film at seal portion at the bottom of a tray, an exceptional performance can be exhibited (in respect of satisfying the antagonistic properties of heat resistance and sealability). Also, the present invention was successful for the first time in making the film thickness practically very thin, while maintaining its strength characteristic and handling characteristic. For example, by the test in the market, wrapping was found to be possible by use of the film of the present invention with a very thin thickness of 10μ, in place of a plasticized PVC stretch film with a thickness of 18μ, while satisfying the respective requirements. An ultra-thin film of 7μ is also available. It has also been found that an article which has been wrapped with a plasticized PVC stretch film with a thickness of 26μ due to stringent requirements for characteristics can be wrapped with a film of the present invention having a thickness of 10μ.

In addition to the specific features as described above, it is also possible to take the advantage of the specific feature of low temperature shrinkability. This is a particularly desirable property in the case of using a tray of not square form or when the article to be wrapped cannot be well finished only by stretch wrapping. During sealing, by the heat at the sealed portion, the portion near the sealed portion or whole of the film is shrunk simultaneously with sealing, whereby wrapping can be finished tightly. Further, even in the case of finishing according to shrink wrapping without stretch, complete wrapping can be accomplished rapidly by use of the film of the present invention under more advantageous conditions, such as hot air with lower temperature than the shrink wrapping method of the prior art. Improvements are also realized with respect to the extent of maintenance of heat at the sealed portion by covering over the sealed portion, very simple method of applying only stirring of the air, and better heat efficiency without causing denaturation of the article to be wrapped by giving heat thereto. Wrapping by way of stretch-and-shrink wrapping with the use of such a film as described above has never been accomplished in the art, and it can be another effective use and specific feature of the present invention in practical application, whereby the scope of wrapping can be widened to a great extent.

Having described the present invention by referring to the use as described above, the present invention is not limited only to such a use, but it is an epoch-making film which can be utilized for various kinds of uses.

The film of the present invention is a film endowed with antagonostic properties of heat resistance, shrinkability and sealability with good balance, and its specific improvement resides in that the value of heat resisance $[T_H]$ ° C. and the value of seal temperature $[T_S]$, as measured by the methods in Examples as hereinafter described, satisfy the relationship in terms of the value of $[T_H\text{-}T_S]$, which is at least 15° C., preferably at least 25° C., more preferably at least 35° C.

The present invention is described by referring to the preferred embodiment of the present invention, by which the present invention is not limited at all.

According to the process of the present invention, by means of respective extruders, the compositions for respective layers are thermoplastified to be molten so that the polymer compositions and the respective layer constitutions may be obtained, extruded according to the method in which the molten resins are extruded through a multi-layer die, the method in which the molten resins are made confluent before extruded through a die or the method in which a resin film extruded through a die is succesively coated with other resins, and thereafter quenched with a liquid coolant to be solidified, thus forming a sufficiently uniform tubular or sheet raw film. In this case, it is preferred to extrude the resins through an annular multilayer die to form a tubular raw film, although the present invention is not particularly limited thereby.

The resultant raw film obtained having the respective layers as constituent layers may be pre-treated to the extent as described above with a high energy ray, such as electron beam, gamma-ray, UV-ray, to a dosage of, in the case of electrom beam, 1 to 10 Megarad, preferably 3 to 7 Megarad. Excessive treatment is not desirable, because unfavorable results may be brought about to various characteristics.

As the next step, the raw film, heated to 100° C. or lower or as such, is subjected to cold stretching at a stretching temperature of 30° C. to 80° C. to an area stretching ratio of 4-times or more to 30-times. The stretching temperature as herein mentioned represents the temperature on initiation of stretching.

Then, the stretched film is specifically modified by changing the orientation by permitting shrinkage of the film at 40° to 100° C. to at least 5 to 50% (area), preferably at 45° to 80° C., more preferably 45° to 70° C., with the degree of shrinkage being preferably 5 to 40 (area) %, more preferably 7 to 30 (area) %.

In the following, the present invention is described by referring to a preferred embodiment, by which the present invention is not limited.

Heating of the raw film may be conducted at 100° C. or lower, preferably 90° C. or lower, more preferably 85° C. or lower. More preferably, a desired film can be obtained conveniently for the first time by heating the film to a temperature without melting the crystal components of the resins constituting mainly the base layer (M layer), the surface layer (S layer) and the H layer and without impairing the properties after quenching, and expanding the film in a bubble under sufficient inner pressure at a temperature lower than the melting points of the original crystal components constituting the main components of the respective compositions of the above layers of 80° C. or lower, preferably 35° to 70° C., more preferably 35° to 65° C., more preferably at a temperature not higher than the Vicat softening point of the original polymer or mixture. The optimum degree of area stretching ratio depends on the respective compositions, layer constitutions and the temperature employed, but is generally 4 to 30-times, preferably 5 to 20-times, of which the degree of stretching in the lateral direction in the preferable case of bi-axial stretching is generally 2 to 6-times, preferably 2 to 4-times. As the conditions for preventing puncture in stretching and affording sufficient cold stretching, the respective compositions and layer combinations within the ranges as specified above are particularly important and at the same time it is also important to prepare a sufficiently uniform raw film. Stretching can be practiced most stably while regulating expansion of the film in the lateral direction by deflating immediately at the maximum diameter portion by means of a roll type deflator. Also, the raw film bubble is conveniently of a large size as permissible by the device, for example, about 30 mm or more in diameter, preferably 50 mm or more in diameter, in view of the relationship between the inner pressure and the diameter. In view of the physical properties of the film obtained, stretching should be done under sufficiently cold conditions, so far as permitted by stability of the bubble. Practically, however, the extent of stretching may be determined according to the composition employed in view of the balance with stability (so as to cause no puncture).

The cold stretching can be stable and the entire thickness of the film can be made uniform, because the stretching temperature is lower than that of conventional process and further there is the synergistic effect of stretching to high degree of the respective layers of the multilayer, whereby the all of layers can be stretched to high degree to give a film having the characteristics as described above. Also, the film thickness can be controlled freely from very thin to thick.

In contrast, according to the conventional stretching method by heating to a temperature higher than the melting method, the stretching temperature must be elevated contrariwise to higher temperature in order to improve optical characteristics, whereby the film will become hardly oriented and the strength of the film tends to be lowered in most cases.

The situation is the same at a temperature of from ±5° to 10° C. of the melting point of the main component of the polymer. Further, not only can no preferable result be obtained with respect to haze or gloss, but also the raw film of the mixed composition becomes brittle at the temperature conditions employed to be sometimes punctured, whereby high characteristics can hardly be imparted to the film. According to a conventional method for combination of layers, when different kinds of resins are combined in a multilayer, the resins have respective optimum stretching temperatures which differ greatly from each other. As a result, most of the combinations cannot be oriented as a whole. Thus, usually, it frequently occurs that only a part of the layers can be subjected to orientation by stretching at the sacrifice of other layers.

As described in Examples hereinafter, stretching of all of the layers as mentioned in the present invention can be accomplished successfully. No such stretching has been known in the art. It can be accomplished through the synergistic effect by use of, for example, a multilayer tube containing a specific mixed composition layer, a uniformly quenched raw film and the conditions of the specific stretching method.

The heating temperature as herein mentioned refers to the maximum temperature in the raw film before stretching, and the stretching temperature mentioned in the present invention refers to the temperature at the portion at which stretching is initiated, wherefrom, as a matter of course, the temperature is lowered by cooling to the region where stretching is completed, as a matter of course. At the region where stretching is completed (the region where the bubble reaches its maximum diameter) or thereafter, the film is cooled sufficiently at least to 45° C. or lower, preferably 35° C. or lower, more preferably 30° C. or lower. Thus, it is preferred to control the temperature difference between the stretching initiation portion and the completion portion at 5° C. or higher, preferably 10° C. or higher, more preferably 15° C. or higher. These values are given when temperatures are measured by means of contact type thermometer from the surface. For example, in the case of Run No. 9 in Examples, the temperature at the stretching initiation portion was found to be 53° C., while those between the portion at the maximum bubble diameter and the raw film during expansion were 50° C. at $\frac{1}{4}$ length from the raw film, 39° C. at $\frac{2}{3}$ length from the raw film and 25° C. at the completed region, respectively. As described above, the process of the present invention can be understood to be a cold stretching method not found in the prior art.

The stretching, in order to carry out high degree of cold stretching smoothly, should preferably be conducted while controlling the air stream at the surface layer portion as uniformly as possible by effecting uniformly heating and blowing air conditioned through air-ring, etc. The raw film should preferably be heated at a temperature not exceeding by 20° C. the temperature at the portion where stretching is initiated, in view of the stability at the start-up.

As a method for controlling the air stream at the surface layer portion, there is, for example, the method in which a rectifying contact guide intended for separating substantially the heating portion from the stretching initiating portion is used, and the fluid (air) accompanying the film surface and its boundary film are removed incontinuously by contact thereby removing nonuniformity caused by the interaction between the heating portion, the stretching initiating portion and the cooling portion. This method can also be employed similarly at the stretching initiating portion, the stretching portion and the stretching completion region. It is peferred that the stretching should be sufficiently stretched in a higher inner pressure within the bubble, for example, a high pressure of from 100 to 5000 mm of water column ($H_2O$) (on the raw film base of $200\mu$ in thickness and 100 mm in diameter), more preferably from 200 to 2000 mm ($H_2O$).

The film obtained according to the process of the present invention has the excellent physical properties as described above, and at the same time has little thickness nonuniformity after stretching in most cases. This may be considered to be due to good uniformity and stability obtained because of the fact that stronger elongating force is imparted to the film by the high inner pressure in the bubble and also that heat hysterisis by heating and cooling is particularly small. As to haze and gloss, while they may appear more or less poorer at the stage of raw film, they can be improved very well after the cold stretching according to the present invention, as one of the characteristics of the invention. Also, by making the multilayer as described above, stability during working can be improved to a great extent to give articles of uniformly high grade, as compared with the case of single layer.

For example, in the case of a single layer of polypropylene, it can be stretched only under a very narrow range, and stretching can hardly be conducted. Continuous stretching can be accomplished only under severe conditions and no stretching is possible under the conditions lower than said range with accompaniment of puncture or only a weak and inferior film whitened can be obtained under the conditions higher than said range. Also, at a temperature around 80° C., or still harder as in the case of the above example, at 35° C., for example, stretching cannot be accomplished at all. This is an entirely surprising fact.

The characteristics obtained of the multilayer film of the invention are more excellent in strength, haze, gloss, low temperature shrinkability, sealability, tearing strength and impact strength as compared with those of a single layer, which are higher in level than the film obtained according to conventional stretching. Next, the film of the present invention is also characterized by that, after stretching, it is subjected to a post-treatment on line or after wind-up, as desired, to effect a part of deorientation of the oriented film to impart elongation and orientation to the film by packaging, and the extents of orientations in the longitudinal and transverse directions may be changed as desired. As a preferable method, the longitudinal and transverse orientations of the film may be modified through the effect of shrinkage between nip rolls to an area ratio of 5 to 50%, preferably 5 to 40%, more preferably 7 to 30% against original dimension before post-treatment depending on the desired characteristics and also the effect of application of heat itself. The temperature for the application of heat may be from 40° to 90° C., preferably from 45° to 80° C., more preferably from 45° to 70° C. Within the conditions as specified above, the above treatment is required to be conducted while maintaining the excellent properties obtained by cold stretching, for example, in order to further impart elongatability to the film, while maintaining its strength, and such a treatment is preferably conducted at a temperature not higher than the m.p. of the surface layer, more preferably also at a temperature not higher than the m.p. of the polymer which is the main component of the base layer.

In preparation of the film, the so called edge portions at both sides of the film may sometimes be cut off. Such edge portions also comprise at least three layers of S layer, M layer and H layer, but the edge portions of the present film can be utilized again as the starting material for M layer. It is preferred that the content of the edge portions for reutilization charged into the extruder for M layer should be 30 wt. % or less. Thus, the relatively expensive starting material to be used in the present invention can be reutilized without being discarded to result in cost reduction. This is another advantage of the present film.

EXAMPLE 1

A resin mixture ($M_{111-3}$) (VSP: 78° C.) was prepared by mixing 65 wt.% of $a_1$: an ethylene-vinyl acetate copolymer [vinyl acetate content: 3.5 mole %, MI: 1.0, m.p.: 95° C., VSP: 79° C.], 20 wt. % of $b_1$: an ethylene-$\alpha$-olefin copolymer thermoplastic elastomer [$\alpha$-olefin is propylene: 15 mole %, 3 wt. % of ethylidenenorbornene randomly copolymerized, MI: 0.45, VSP: 40° C. or lower, density: 0.88 g/cm$^3$], 10 wt.% of $c_1$: a crystalline polypropylene (IPP) [randomly copolymerized with 4 wt. % of ethylene, MFR: 7, m.p. 143° C., VSP: 135° C., density: 0.90 g/cm$^3$] and 5 wt. % of $c_3$: a crystalline polybutene-1 (PB-1) [MI: 1.0, density: 0.905 g/cm$^3$, butene-1 content: 96 mole %, VSP: 103° C., m.p. 117° C.]. A mixture ($M_{111-31}$) for the base layer was prepared by kneading of 100 parts by weight of the resultant mixture ($M_{111-3}$) with 10 parts by weight of an alicyclic saturated hydrocarbon resin ($AS_1$) as the AS agent. Next, as the resin for H layer, 80 wt. % of $c_1$: IPP (as described above) and 20 wt. % of $c_3$ PB-1 (as described above) were mixed together to a composition ($H_1$). Also, as the resin for S layer, $a_2$: EVA [vinyl acetate content: 5.5 mole %, MI: 1.0, m.p. 88° C., VSP: 74° C.] was employed. The above resins, in the order mentioned, were thermoplastified in three extruders, respectively, a first one having a screw of 50 mm diameter (L/D=37) and an injection orifice at the position of L/D=8 from the end portion, a second one having a screw of 40 mm diameter (L/D=29) and a third one having a screw of 40 mm diameter (L/D=37) and an injection orifice at the position of L/D=8 from the end portion, at the maximum temperature of 220° C. at the cylinder portion. In carrying out extrusion, two kinds of anti-fogging agents of diglycerine monooleate and polyoxyethylene nonyl phenyl ether and additives such as mineral oil as the plasticizer were injected to those layers finally in amounts of 1.5 wt.%, 1.0 wt. % and 0.5 wt. %, respectively, 3.0 wt. % as the total (in Run No. 4 and No. 5, the total amount was made 1.5 wt. %) through the injection orifices at the extruders for the base layer and S layer. These compositions were kneaded and co-extruded through a five-layered annular die. Then, the extruded product was quenched at the position which was about 6 cm distance from the lip end of the die by the water-cooling ring from which water was uniformly flowed out to obtain various raw films with a diameter of 180 mm. They are shown in Table 1. In Run No. 4 and No.5, only PB-1:$c_3$ was employed for H layer.

TABLE 1

|  | Run No. | | | | | Control | | |
|---|---|---|---|---|---|---|---|---|
|  | 1 | 2 | 3 | 4 | 5 | 1 | 2 | 3 |
| Layer structure of raw film | | | | | | | | |
| First(S) layer μ | 5 | 7 | 11 | 20 | 30 | — | — | — |
| Second(M) layer μ | 15 | 25 | 33 | 60 | 90 | — | — | — |
| Third(H) layer μ | 10 | 7 | 22 | 40 | 60 | 120 | — | — |
| Fourth(M) layer μ | 15 | 24 | 33 | 60 | 90 | — | 120 | — |
| Fifth(S) layer μ | 5 | 7 | 11 | 20 | 30 | — | — | 120 |
| Total thickness (μ) | 50 | 70 | 110 | 200 | 300 | 120 | 120 | 120 |

In each raw film, thickness variation (circumferential direction) was less than ±2%. These raw films were passed through two pairs of delivery nip rolls and draw nip rolls and heated therebetween to 45° C. with hot air, followed by inflation with air as such at a stretching temperature of 44° C., and expanded continuously by means of a rectifying contact guide to be stretched approximately to from 3.3 to 3.6 times in the longitudinal direction and from 3.2 to 3.4 times in the transverse direction. The end region of stretching is cooled with an air ring through which cold air of 18° C. is blasted, and the stretched film was folded with a deflator, drawn up with nip rolles, air of 50° C. was blown against the film, and the film was further subjected to shrinking in the heat treatment zone between to pairs of nip rolles slower by 15% in the outlet speed to predetermined rates of 15% in longitudinal direction and 10% in lateral direction, simultaneously with application of stabilizing treatment. The film was separated into two sheets of films by slitting its edge and wound up under respective tensions to obtain the desired films with respective thicknesses. Table 2 shows the various characteristic values of the films obtained and four kinds of commercially available films a, b, c and d which are Controls.

The raw film of Control 1 could not be stretched under the same conditions but punctured, and it was gradually elevated in temperature up to 150° C. At a temperture of 140° C., it could be at last stretched. This film had a white appearance, with a stretching characteristic prone to breaking and without low temperature shrinkability, namely having a shrinkage of 2 to 3% at 80° C.

On the other hand, the sample of Control 2, could be stretched under the same conditions, but lacking slightly stability as compared with those of Run No. 1–5, being also deficient in anti-fogging characteristic with staining on the surface. Further, the sample of Control 3 was unstable in stretching and is readily punctured. The film of Control 2 had excellent gloss and haze value as such, but worsened to a haze value of 8% when shrunk sufficiently to 40%. The film of Control film 3 is excellent in both in gloss and haze value, but instable in film dimensions at room temperature and devoid of heat resistance, being susceptible to melting with formation of holes when sealing of the film is attempted.

Other samples of Run No. 1–5 were stable in stretching without staining on the surface, and also excellent in anti-fogging characteristic.

TABLE 2

| Characteristics | Unit | 1 | 2 | 3 | 4 | 5 | Control 2 | Control 3 | Control a | Control b | Control c | Control d |
|---|---|---|---|---|---|---|---|---|---|---|---|---|
| Haze | % | 0.3 | 0.5 | 0.7 | 1.0 | 1.1 | 1.7 | 0.5 | 1.7 | 2.5 | 2.0 | 2.0 |
| Shrink percentage (80° C.) | % | 30 | 35 | 36 | 37 | 34 | 40 | 57 | 33 | 5 | 0 | 0 |
| Tensile strength | Kg/mm² | 7.1 | 8.2 | 9.1 | 7.6 | 7.0 | 6.5 | 4.9 | 8.0 | 6.9 | 2.2 | 3.1 |
| Tensile elongation (LD/TD) | % | 250/370 | 260/320 | 290/350 | 280/360 | 250/350 | 220/280 | 200/280 | 120/170 | 100/120 | 200/400 | 250/300 |
| Stress on 100% elongation (LD/TD) | Kg/cm width | 290/120 | 300/150 | 400/190 | 450/160 | 600/290 | 280/130 | 270/100 | 500/1400 | 1100/1200 | 200/120 | 350/150 |
| Stress on 200% elongation (LD/TD) | Kg/cm width | 550/200 | 600/230 | 650/280 | 800/350 | 1200/450 | 500/250 | 500/230 | —/— | —/— | 250/140 | 500/250 |
| Dart impact strength *1 | Kg · cm | 14 | 18 | 24 | 36 | 49 | 25 | 16 | 16 | 8 | 6 | 7 |
| Sealing temperature *2 | °C. | 85 | 87 | 88 | 95 | 110 | 128 | 90 | 160 | 170 | 100 | 180 |
| Heat resistant temperature *3 | °C. | 150 | 150 | 155 | 160 | 170 | 125 | 87 | 150 | 165 | 95 | 165 |
| Hand wrappability *4 | — | ⊚⊚ | ⊚⊚ | ⊚⊚ | ⊚ | ⊚ | ×△ | ×⊚ | ×△ | ×△ | △⊚ | ⊚⊚ |
| Anti-fogging property *5 | — | ⊚ | ⊚ | ⊚ | ○ | ○ | △ | △ | ⊚ | ⊚ | ⊚ | ○ |
| Surface staining resistance *6 | — | ⊚ | ⊚ | ⊚ | ⊚ | ○ | △ | × | △ | △ | × | × |
| Sealability *7 | — | 6 | 8 | 13 | 25 | 38 | 14 | 15 | 13.5 | 15 | 21 | 18 |
| Film thickness | μ | | | | | | | | | | | |

*LD/TD = longitudinal direction/transverse direction.

*1 In carrying out measurement according to ASTM-D-1709-67, a head was employed in which a groove-edge portion was provided in the missile head to effect bursting more easily.

*2 The lower limit of the temperature, at which, when a tray of a commercially available high impact Styrol (10 cm × 20 cm) is wrapped with a film to form a portion with folding of four films, a portion with folding of two films and a portion with one film and the films with two or more films are sealed by pressing under a force of 2 g/cm² for 3 sec., and not peel-off occurs even when the end portion may be lightly drawn.

*3 The temperature, at which a hole is formed somewhere in the film, when the folded portion of the films is pressed under a pressure of 4 g/cm² for 3 sec. according to the above method *2. (provided that, when the film thickness was 20μ or more, evaluation was conducted for the portion with two films laminated, both in cases of *3 and *4).

*4 The ranks of evaluation of wrapping without generation of creases, with good stretchability, without breaking and with neatness, when hand wrapping is conducted with two oranges places on a tray made of an expanded polystyrene by means of a commercially available hand wrapper for stretch wrapping:
⊚: all could be wrapped best;
○: wrapped considerably well;
△: creases remained partially, with the film being easily broken;
×: unable to remove creases at all, film broken or tray broken, thus enabling no wrapping at all.

*5 Film was extended over a vessel holding water of about 15° C., and the water droplets attached there on, when left to stand in a refrigerator of 5° C. for ten minutes, were observed:
⊚: uniform water layer formed to enable complete observation of the inner portion therethrough;
○: water layer not completely formed, with unevenness, thus affording observation only of the inner portion in deformed state;
△: water droplets attached with large droplets, with only a part of the inner portion being seen;
×: water droplets attached wholly to permit no observation of the inner portion.

*6 Bleeding irregularity of the additive on the film surface was examined:
⊚: entirely uniform;
○: slightly thin pattern generated;
△: pattern generated all over the surface;
×: the surface stained and sticky.

*7 The level of sealability with the hot plate at the bottom portion during wrapping in the above *4 was examined by selecting the optimum temperature:
⊚: sealing effected substantially completely over the entire surface with broad temperature conditions (i.e. difference between the sealing temperature in *2 and heat resistant temperature in *3 is great);
○: 60–80% of the entire surface sealed;
△: spot sealing is possible, but holes formed when attempted to seal the entire surface;
×: a part sealed, but simultaneously with melting of other portions to form holes.

Control sample of (a) is a commerically available PVC shrink film moderately plasticized (20 wt. %.)—oriented film—.

Control sample of (b) is a commerically available crosslinked polyethylene shrink film—oriented film—.

Control sample of (c) is a commerically available non-PVC type (EVA containing 20 wt. % of VAC) stretch film—non-oriented film—.

Control sample of (d) is a commerically available highly plasticized (31 wt. % of plasticizer) PVC type stretch film—non-oriented film—.

The films obtained were found to be excellent in all the characteristics and more excellent than the samples of Controls.

The films of Run No. 1 and No. 2 could be wrapped excellently with sufficiently good finishing and sealing with the hot plate, while clearing the problems in the respective wrapping steps, by means by any kind of wrapping machines. For example, commercially available automatic wrapping machines for stretching wrapping may be classified into those of the pillow system wherein the film is stretched along the flow direction in the width direction and the film edges are folded in both ends of the tray and those of the type in which the film is cut to desired sizes according to the thrusting system and drawn from the four directions, with the product carried on the tray being thrusted atainst the film and the film being folded from the four directions. Thus, the films of the present invention are available in either type of these wrapping machines. Also, when a cover is placed on the hot plate for sealing to maintain the heat in the sealing portion, or a hot air of 70° C. or lower is circulated, a wrapped product in the form raised above the tray can be completely finished in wrapping, even when loosely wrapped. Such a wrapping form (stretch+shrink wrapping) is one of the wrapping methods, taking sufficient advantage of the specific feature of this film.

Also, good wrapped products could be obtained, when the films of Run No. 1, 2 and 3 were used for wrapping by means of the hand-wrapper wrapping machine (manual machine) with stretching. Next, as the practical shrink wrapping test, with the use of the films of Run No. 1, 2 and 3, four cucumbers were wrapped loosely by means of a commercially available L-type wrapping machine, with the end portions being sealed by melting to be formed into bags, followed by passing through a commerically available tunnel with blowing of hot air of 90° C. for two seconds, whereby shrink wrapping could be effected tightly without any crease with excellent fitting and wrapped finishing, thus giving beautiful shrink wrapping without worsening of optical characteristics after shrinkage. Also, good wrapping results could be obtained within a broad temperature range from lower temperature side and within a broad speed range. Such a shrink wrapping method is also one of the wrapping methods which can make use of the specific features of the present invention. It was also confirmed that a loosely wrapped tray pack could be tightly wrapped only by treatment with hot air at 70° to 80° C. for 0.5 to 1 sec. No such result was possible with the use of the films of the Controls (a), (b), (c) and (d).

As described above, the film of the present invention has more specific features in uses of stretch films than the products of the prior art and can completely satisfy these uses. At the same time, it is also available in uses for shrink wrapping of the prior art or novel and more advantageous wrapping method as the film for stretch-shrink wrapping in which the advantages of the both wrapping methods have been incorporated. In particular, the film of the present invention is suitable as the film of stretch wrapping, and it can sufficiently compete with a plasticized PVC type film with a thickness of $18\mu$ and an EVA type stretch film with a thickness of 20 to $22\mu$, even with a thickness of 6 to $8\mu$, and it is also a multi-purpose film having epoch-making performance and expected to contribute much to the world.

EXAMPLE 2

According to the same procedure as described in Example 1, employing further one additional extruder as described above having a screw with 40 mm diameter (L/D=37), the raw films having the respective compositions and the combinations of layers as shown in Table 3 were obtained according to the method of adding the additives as hereinafter described. Among these, in Run No. 14, the raw film was irradiated with an electron beam (energy of 500 kV) as the energy ray at a does of 5 Mrad (insoluble gel of the base layer: 12 %, MI of the base layer: 0.08). Then, similarly as described above, the heating temperature was suitably selected within the range from 40° to 60° C., and cold stretching was performed at stretching temperatures of 35°, 47°, 45°, 53°, 46°, 45°, 44°, 40°, 46° and 45° C., respectively, for Run No. 6–14 and Control 4 (these temperatures are all lower than the Vicat softening points of the polymer mixtures for the base layers as described below), followed by the post-treatment as described in Example 1 to obtain the films as shown in Table 4.

In the above Run No. 7, 8, 9, 12, 13, and 14, the carrier resin of an alicyclic saturated hydrocarbon resin (AS-1) was added to 100 parts of the respective resins for the base layers in amounts of 5, 3, 15, 7, 10 and 7 parts by weight and kneaded. Also, as the anti-fogging agent, a mixture of oleic acid monoglyceride and polyglycerine monolaurate at a weight ratio of 1:2 was added in each layer at a proportion of 2.5 wt. % and kneaded, followed by extrusion and stretching as described above.

TABLE 3

| Layer structure of raw film | Run No. | | | | | | | | | Control 4 |
|---|---|---|---|---|---|---|---|---|---|---|
| | 6 | 7 | 8 | 9 | 10 | 11 | 12 | 13 | 14 | |
| First layer $\mu$ (S layer) | $a_1$ 11 | $a_1$ 6 | $a_1$ 7 | $a_2$ 18 | $a_1$ 10 | $a_2$ 12 | $a_2$ 10 | $a_2$ 8 | $a_{10}$ 11 | $a_2$ 18 |
| Second layer $\mu$ (Base layer) | $M_{112}$ 28 | $M_{321}$ 15 | $M_{511-3}$ 15 | $M_{1-611}$ 24 | $M_{131}$ 20 | $M_{141}$ 22 | $M_{151}$ 30 | $M_{111-3}$ 20 | $M_{111-3}$ 30 | $M_{112}$ 84 |
| Third layer $\mu$ (H layer) | $H_2$ 33 | $H_1$ 18 | $H_0$ 20 | $H_3$ 36 | $H_4$ 16 | $H_1$ 12 | $H_3$ 5 | $H_4$ 21 | $H_1$ 11 | — |
| Fourth layer $\mu$ (Base layer) | $M_{112}$ 28 | $M_{411}$ 15 | $M_{511-3}$ 25 | $M_{1-611}$ 24 | $M_{131}$ 26 | $M_{111-3}$ 22 | $M_{110}$ 27 | $M_{011}$ 14 | $M_{1-611}$ 47 | — |
| Fifth layer $\mu$ (S layer) | $a_2$ 11 | $a_1$ 6 | $a_1$ 8 | $a_2$ 18 | $a_1$ 8 | $a_2$ 12 | $a_2$ 8 | $a_2$ 7 | $a_{10}$ 11 | $a_1$ 18 |

TABLE 3-continued

| Layer structure of raw film | Run No. | | | | | | | | | Control 4 |
|---|---|---|---|---|---|---|---|---|---|---|
| | 6 | 7 | 8 | 9 | 10 | 11 | 12 | 13 | 14 | |
| Total ($\mu$) thickness | 111 | 60 | 75 | 120 | 80 | 80 | 80 | 70 | 110 | 120 |

TABLE 4

| Characteristics | Unit | Run No. | | | | | | | | | Control 4 |
|---|---|---|---|---|---|---|---|---|---|---|---|
| | | 6 | 7 | 8 | 9 | 10 | 11 | 12 | 13 | 14 | |
| Haze | % | 0.4 | 0.3 | 0.5 | 1.0 | 0.8 | 0.6 | 0.7 | 0.9 | 0.6 | 0.9 |
| Shrink percentage (80° C.) | % | 31 | 30 | 34 | 30 | 31 | 30 | 28 | 35 | 37 | 35 |
| Tensile strength | Kg/mm$^2$ | 6.9 | 7.5 | 8.3 | 7.0 | 7.5 | 8.1 | 7.2 | 6.7 | 10.0 | 6.0 |
| Tensile elongation (LD/TD) | % | 270/350 | 250/370 | 240/330 | 290/350 | 310/310 | 240/290 | 230/300 | 220/360 | 210/340 | 200/250 |
| Stress on 100% elongation (LD/TD) | Kg/cm width | 290/180 | 310/150 | 270/140 | 350/195 | 280/170 | 260/210 | 250/180 | 245/190 | 330/210 | 300/200 |
| Stress on 200% elongation (LD/TD) | Kg/cm width | 600/280 | 550/290 | 590/250 | 610/380 | 570/300 | 580/320 | 560/250 | 530/220 | 650/320 | 700/355 |
| Sealing temperature | °C. | 84 | 87 | 86 | 88 | 90 | 86 | 87 | 88 | 92 | 85 |
| Heat resistant temperature | °C. | 140 | 155 | 150 | 147 | 153 | 150 | 141 | 144 | 175 | 110 |
| Sealability | — | ⊙ | ⊙ | ⊙ | ⊙ | ⊙ | ⊙ | ⊙ | ⊙ | ⊙ | △ |
| Hand wrappability | — | ⊙ | ⊙ | ⊙ | ⊙ | ⊙ | ⊙ | ⊙ | ⊙ | ⊙ | ○ |
| Anti-fogging property | — | ⊙ | ⊙ | ⊙ | ⊙ | ⊙ | ⊙ | ⊙ | ⊙ | ⊙ | ⊙ |
| Surface staining resistance | — | ⊙ | ⊙ | ○ | ○ | ⊙ | ○ | ⊙ | ⊙ | ⊙ | ○ |
| Film thickness | $\mu$ | 12 | 7 | 8.5 | 15 | 9 | 10 | 9 | 8 | 13 | 15 |

The respective symbols in the Table show the following resins or resinous compositions:

$M_{112}$: A mixture comprising 65 wt. % of EVA ($a_1$), 15 wt. % of the elastomer ($b_1$) and 20 wt. % of an IPP [MFR: 2.2, m.p.: 164° C., VSP: 151° C., density: 0.91 g/cm$^3$] ($c_2$), said mixture having a VSP of 76° C.;

$M_{321}$: A mixture comprising 60 wt. % of EVA [vinyl acetate content: 7.5 mole %, MI: 2.5; m.p.: 79° C., VSP: 62° C.] ($a_3$), 20 wt. % of an elastomer [ethylene-α-olefin thermoplastic elastomer, with the α-olefin being butene-1, which is a random copolymer, butene-1 content: 12 mole %, MI: 4.0, VSP: 50° C., density 0.89 g/cm$^3$] ($b_2$) and 20 wt. % of IPP ($c_1$);

$M_{411}$: A mixture comprising 60 wt. % of EVA[Vinyl acetate content: 2 mole %, MI: 0.6, m.p. 100° C., VSP: 84° C.] ($a_4$), 20 wt. % of the elastomer ($b_1$) and 20 wt. % of IPP ($c_1$);

$M_{511-3}$: A mixture comprising 55 wt. % of EEA[ethyl acrylate content: 5 mole %, MI: 1.5, m.p. 86° C., VSP: 61° C.] ($a_5$), 15 wt. % of the elastomer ($b_1$), 15 wt. % of the IPP ($c_1$) and 15 wt. % of the PB-1 ($c_3$);

$M_{1-611}$: A mixture comprising 35 wt. % of EVA ($a_2$), 30 wt. % of L-LDPE [octene-1 is comonomer, 3.6% copolymerized, MI: 2.3, density: 0.915 g/cm3, m.p.: 116°-120° C. VSP: 98° C.]: ($a_6$), 20 wt. % of the elastomer ($b_1$) and 15 wt. % of the IPP ($c_1$);

$M_{131}$: A mixture comprising 70 wt. % of the EVA ($a_1$), 15 wt. % of an elastomer (butyl rubber, VSP: 40° C. or lower) ($b_3$) and 15 wt. % of the IPP ($c_1$);

$M_{141}$: A mixture comprising 65 wt. % of the EVA ($a_1$), 15wt. % of an elastomer (styrene-butadiene block copolymer thermoplastic elastomer MI: 2.6) ($b_4$) and 20 wt. % of the IPP ($c_1$);

$M_{151}$: A mixture comprising 70 wt. % of EVA ($a_1$), 15 wt. % of an elastomer (EPDM rubber, non-thermoplastic with 50 mole % of ethylene content, Mooney viscosity of 40° at 100° C.) (ML$_{1+4}$) and 15 wt. % of IPP ($c_1$);

$M_{110}$: A mixture comprising 75 wt. % of EVA ($a_1$) and 25 wt. % of the elastomer ($b_1$);

$M_{011}$: A mixture comprising 70 wt. % of the elasomer ($b_2$) and b 30 wt. % of the IPP ($c_1$);

$H_0$: IPP [7 wt. % of ethylene randomly compolymerized, MFR: 6, m.p. 135° C., VSP: 125° C.] ($c_0$);

$H_1$: IPP ($c_1$)=80 wt. %, PB-1 ($c_3$)=20 wt %;

$H_2$: PB-1 ($c_3$);

$H_3$: A mixture comprising 75 wt. % of IPP [ethylene content: 7 wt. %, MFR: 5, m.p.: 135° C., VSP: 128° C.] ($c_4$) and 25 wt. % of APP [atactic pp, VSP: 50° C.];

$H_4$: A mixture comprising 80 wt. % of the IPP ($c_0$) and 20 wt. % of an alicyclic saturated hydrocarbon resin;

$a_7$: EMMA [methyl methacrylate content: 6 mole %, MI: 2.5, m.p.: 85° C., VSP: 63° C.];

$a_8$: Ionomer [ethylene-methacrylic acid copolymer, Na-neutralized type, methacrylic acid content: 6.6 mole %, MI: 1.0, neutralilzation: 25%, saponification: 50%, m.p. 80° C., VSP: 64° C.];

$a_9$: crystalline 1,2-polybutadiene (crystallinity: 25 %, 1,2-bonding: 92%, MFR (150° C., load 2160 g): 3.0, density: 0.906 g, m.p.=80° C., VSP=52° C.); and $a_{10}$: EVA [vinyl acetate content: 3.5 mole %, MI: 4.0, m.p.: 93° C., VSP: 75° C.]

All the films of Run No. 6-14 were satisfactory with good values of physical properties. For comparative purpose, the raw film of Run No. 9 was utilized, and it was subjected only to cold stretching in the same manner as described above without post-treatment. The film obtained had a thickness of 12μ, longitudinal/transverse stresses at 100% and 200% elongations of 1000/600 and 1700/1000 (g/cm-width), respectively. In stretch wrapping, creases were generated abundantly, and the film could be elongated when drawn strongly, but with breaking of tray. Thus, wrapping could not be practiced well. However, this film could be sufficiently finished within 1 to 2 seconds according to the shrink method with the hot air of lower temperature of 80° to 90° C.

Each one of the films of Run No. 6-14 according to the present invention, when wrapped by the stretch wrapping machine as described above, could be wrapped and sealed excellently. The film of control 4 was narrow in the proper temperature range as 85° to 110° C., whereby the temperature control was slightly difficult and the dimensional stability of the film was also poor (the film rolled up will be deformed with lapse of time). All of the films of Run No. 6-14 were good in balance of heat resistance, stretchability and sealability, compensating synergistically mutually for antagonistic properties, with the result that all the properties are satisfied.

EXAMPLE 3

According to the same procedure and and the same recipe of additives as described in Example 2, with the use of a base layer with a mixed composition of 100 pph of $M_{111-3}$ with 5 pph of $AS_1$ for the second and fourth layers, H layer with a mixed composition of the aforesaid $c_1/c_3 = 7/3$ ($H_5$) for the third layer and surface (S) layers of EEA ($a_5$), LL ($a_6$), an ethylene-α-olefin thermoplastic elastomer ($b_2$), thermoplastic crystalline 1,2-polybutadiene ($a_9$), EMMA ($a_7$) and Ionomer ($a_8$) for the first and fifth layers, five-layered raw films were prepared as Run No. 15, 16, 17, 18, 19 and 20 according to the combinations shown in Table 5. The thicknesses of the respective layers of the first to fifth layers were 7, 20, 8, 29 and 6μ, respectively (70μ as the total).

TABLE 5

| | Run No. | | | | | |
|---|---|---|---|---|---|---|
| | 15 | 16 | 17 | 18 | 19 | 20 |
| Layer structure of raw film | | | | | | |
| First layer | $a_5$ | $a_6$ | $b_2$ | $a_9$ | $a_7$ | $a_8$ |
| Second layer | | | | $M_{111-3}$ | | |
| Third layer | $H_5$ | $H_5$ | $H_5$ | $H_5$ | $H_5$ | $H_5$ |
| Fourth layer | | | | $M_{111-3}$ | | |
| Fifth layer | $a_5$ | $a_6$ | $b_2$ | $a_9$ | $a_7$ | $a_8$ |

For the skin layers (the first and fifth layers), the same carrier as in Example 1 was used as the tackifier (P agent) in combination in an amount of 1.5 parts by weight with 100 parts by weight of $a_6$. Also, for the base layers (the second and fourth layers), 7 parts by weight of $AS_1$ were employed as the carrier (AS agent) in each Run No. 15, 17 and 18 per 100 parts by weight of the base layer resin, while 7 parts by weight of the above APP ($AS_2$) were employed in Run No. 16, 10 parts of EVA ($AS_3$) with 40 wt. % of VAC in Run No. 19 and 5 parts by weight of the resin of $a_9$ ($AS_4$) in Run No. 20.

Stretching could be practiced for each sample. The post-treatment was applied at 50° C. by permitting the film to shrink by 10% longitudinally and by 20% transversely. The stretching temperatures were 46°, 59°, 42°, 40°, 5° and 51° C., respectively. As Controls, the base layers of the second and fourth layers were omitted in Run No. 15-20, and the third layer was made 30μ to obtain raw films of 100μ. When stretching was attempted to be carried out for these films, no cold stretching could be effected, but the film was punctured when it was expanded to a transverse expansion ratio (BUR) of 1.5 to 2.0 by sealing the air into the bubble. Accordingly the temperature was gradually elevated up to 92° C., whereas only Run No. 16 and 20 were unstable to result immediately in puncture of the bubbles, and only small amount of films could be obtained. However, these films were white in color, with haze values of 20 and 15%, respectively, shrinkages at 80° C. being 4 and 6%, respectively and the tensile strengths at break as low as 4.2 and 3.9 $Kg/mm^{22}$. Thus, only films with low strength could be obtained. Each of the films of Run No. 15-20 was about 10μ in thickness, and satisfied all the characteristics as films for stetch wrapping, exhibiting respectively the Haze values of 0.7, 1.0, 0.6, 0.5, 0.9 and 0.4 (%); tensile strengths at break of 6.9, 8.0, 7.0, 7.3, 7.1 and 7.0 ($Kg/mm^2$); elongations at break (longitudinal/transverse) of 250/320, 270/360, 240/300, 250/300, 220/290 and 300/150 (%/%); stress at 100 % (longitudinal/transverse): 310/130, 380/140, 230/110, 300/100, 270/120 and 300/150 (Kg/cm-width); stress at 200% (longitudinal/transverse): 600/290, 650/310, 500/240, 570/220, 540/280 and 590/320 (Kg/cm-width); sealability being all ⊙, hand wrappability being all ⊙, anti-fogging property being ⊙, ○, ⊙, ⊙, ⊙, ○, and surface staining resistance being all ⊙.

The samples applied with no post-treatment could not afford strength wrapping with an adequate stress, but creases could not but remain on a part of the product to be wrapped, thus involving the problem in wrapping finishing. Good looking finishing can be accomplished by permitting the crease portion to be shrunk by blowing hot air of 60° to 80° C. for 0.5 to 1 sec.

EXAMPLE 4

According to the same method as in Example 1, EVA ($a_2$) was employed for the first and fifth layers (S layer), a mixed composition of $M_{2111}$ containing 65 wt. % of EVA ($a_2$), 20 wt. % of the elastomer ($b_1$), 10 wt. % of IPP ($C_1$), 5 wt. % of $AS_1$ as AS agent for the second and fourth layers (M layer), and $H_5$ comprising 70 wt. % of IPP ($c_1$) and 30 wt. % of PB-1 ($c_3$) for the third layer (H layer). The M layers contained anti-fogging agents of 2 wt. % as the total of a 2/1 mixture of glycerine monooleate and diglycerine monolaurate, and the thickness ratios of the respective layers were controlled to 20% for S layers (each 10% for both the first and fifth layers), 65% for M layers (each 32.5% for both the second and fourth layers) and 15% for H layer (the third layer) to obtain a raw film. The raw film was stretched and subjected to the predetermined post-treatments as shown in Table 6 to obtain stably and uniformly films of about 10μ in thickness.

TABLE 6

| | Run No. | | | | Control | | | |
|---|---|---|---|---|---|---|---|---|
| | 21 | 22 | 23 | 24 | 5 | 6 | 7 | 8 |
| Treatment tempera- | 45 | 50 | 60 | 70 | 20 | 50 | 110 | 110 |

TABLE 6-continued

| | Run No. | | | | Control | | | |
|---|---|---|---|---|---|---|---|---|
| | 21 | 22 | 23 | 24 | 5 | 6 | 7 | 8 |
| ture (°C.): | | | | | | | | |
| Longitudinal shrinkage (%): | 10 | 15 | 20 | 5 | 2 | 0 | 15 | 2 |
| Transverse shrinkage (%): | 20 | 25 | 5 | 10 | 1 | 1 | 27 | 2 |

EXAMPLE 5

According to the same procedure as in Example 4 as described above, using the same layer constitution, composition and additives, and also the compositions of M layers except for those indicaed in Table 8 below, films were obtained and stetched. Post-treatment of each film was conducted at a treatment temperature of 50° C., with longitudinal shrinkage of 10% and transverse shrinkage of 15%. M layers were constituted as follows to obtain films of about 10μ, respectively.

TABLE 7

| | | Run No. | | | | | | | |
|---|---|---|---|---|---|---|---|---|---|
| Characteristics | | 21 | 22 | 23 | 24 | Control 5 | Control 6 | Control 7 | Control 8 |
| Haze | % | 0.5 | 0.8 | 0.7 | 0.9 | 0.6 | 0.8 | 7.5 | 13.0 |
| Tensile strength | (LD/TD) Kg/mm$^2$ | 9.7/7.8 | 8.5/7.9 | 7.7/8.0 | 9.5/7.6 | 13.5/9.5 | 12.4/9.4 | 3.1/2.8 | 2.6/2.5 |
| Tensile elongation | (LD/TD) % | 290/370 | 340/390 | 390/310 | 280/350 | 200/200 | 210/210 | 125/260 | 110/170 |
| Stress on 100% elongation | (LD/TD) Kg/cm width | 380/150 | 330/130 | 290/190 | 350/170 | 950/400 | 900/350 | 200/100 | 220/120 |
| Stress on 200% elongation | (LD/TD) Kg/cm width | 600/230 | 550/220 | 560/310 | 630/290 | 1350/950 | 1200/820 | —/160 | —/(150) |
| Dart impact strength | Kg · cm | 19 | 20 | 18 | 16 | 23 | 20 | 4.7 | 3.0 |
| Hand wrappability | — | ⊚ | ⊚ | ⊚ | ⊚ | x | x | x | x |

Each of Run No. 21–24 involved no problems in transparency, film strength, hand wrappability, sealability, and anti-fogging property and each was excellent in wrappability by means of a stretch wrapping machine. But the sample of Control 5, which corresponded to the film of Blank with no application of the heat treatment of the present invention, but too high in stress at 100% and 200% elongation, and could hardly be stretched during stretch wrapping. The same tendency was also observed for the film of Conrol 6. The film of Control 6 was treated without shrinkage during heat treatment and it was a film to which no effective elongation was imparted. The film of Control 7 was treated by shrinkage under high temperature, but its transparency was worsened to be lowered in film strength, with the result that it was brittle, was readily broken, and was accompanied with extreme thickness irregularity (necking phenomenon) in the transverse direction when the film was stretched, whereby the yield point occurred in the S-S curve. Thus, this film could not be utilized for stretcth wrapping at all. The same tendency was also observed for the sample of Control 8, which was also brittle.

For samples of Run No. 21-24 and Control 5 and 6, the remaining low temperature shrinkages at 80° C. were from 20 to 45%, but there was substantially no low temperature shrinkage remained in Control 7 and 8. This means insufficiency in post-treatment of Control 5 and 6. In short, Control 5 is the blank of the cold stretched film itself, while Control 6 was subjected to heat treatment without shrinkage. With such a treatment, no effective elongation could be imparted to the film. The film of Control 7, while it was subjected to shrinking treatment, suffers from loss of good properties obtained by cold stretching because of too high treatment temperature, whereby no synergistic effect could be exhibited. Also, Control 8 became embrittled by a similar excessive treatment.

TABLE 8

| | Run No. | | | | |
|---|---|---|---|---|---|
| | 25 | 26 | 27 | 28 | 29 |
| Composition of M layer | | | | | |
| EVA (a$_2$) | 75 | 70 | 65 | 60 | 55 |
| Elastomer (b$_1$) | 15 | 15 | 15 | 15 | 15 |
| IPP (c$_1$) | 10 | 10 | 10 | 10 | 10 |
| AS agent (AS$_1$) | — | 5 | 10 | 15 | 20 |

Each of these films was without any problem, having the properties within the following ranges: haze of from 0.5 to 0.8%, tensile strength at break (longitudinal/transverse) of (11 to 8)/(7 to 10) (kg/mm$^2$), elongation at break (longitudinal/transverse) of (280 to 390)/(300 to 400) (%); falling dart impact strength of from 18 to 22 kg.cm, other characteristics being also within preferable ranges. Also, the stresses at 200% elongation (longitudinal/transverse) for Run No. 25–29 were 700/500, 550/360, 510/300, 460/250 and 430/200 (g/cm-width), while those at 100% elongation were similarly in the same order 400/330, 320/230, 280/180, 260/150 and 250/130 (g/cm-width), respectively. In the hand wrapping test, which was carried out by wrap stretching the film in the transverse direction, the film of Run No. 25 was too heavy and hardly stretched, but wrapping could be at last accomplished. The films of Run No. 26–29, particularly 27–29, could be wrapped smoothly.

As to the behaviour during cold stretching, the films of Run No. 26–28 tended to be particularly excellent in stability as compared with Run No. 25. On the other hand, lowering in stress at elongation (particularly stress at elongation within the range from 100 to 200 %) was found to be greater as the amount of AS agent was increased fron Run No. 25 to Run No. 29.

EXAMPLE 6

According to the same procedure and the same compositions as employed in Example 4, except for the combinations of the respective layers in the raw films as shown in Table 9 and incorporation of additives in both S layer and M layer, stretched films were obtained. The conditions for post-treatment followed the same conditions as in Run No. 22. As the result, films of about 11μ in thickness with stable working conditions could be obtained.

These films, as written in the order of Run No. 30, 31, 32 and 33, had the following physical properties, namely haze values (%) of 1.5, 0.6, 1.4 and 0.7; tensile strengths at break (longitudinal/transverse=LD/TD) (kg/mm$^2$) of 8.5/7.6, 9.0/8.0, 10.5/8.6, 11.0/8.2; elongations at break (%) (LD/TD): 235/350, 260/430, 275/340 and 250/320; Dart Impact Strength (Kg cm): 16.0, 17.5, 18.5 and 19.5; Stress at 200% elongation (g/cm-width)(LD/TD): 650/240, 560/230, 680/320 and 700/310; Stress at 100% elongation (g/cm-width) (LD/TD): 370/190, 300/150, 400/220 and 430/210; sealability being  ,  ,  , and  , respectively; hand wrappability being all  ; anti-fogging property being all  ; and surface staining resistance being  ,  ,  , and  , respectively, each being satisfactory and excellent as the film for stretch wrapping. On the other hand, the film of Control 9 could be cold stretched smoothly, but the film is prone to be curled as one sheet, and shrinked creases are generated on the third layer (H layer) when subjected to the post-treatment, whereby the haze value became 16% to give a white impression, and the surface characteristics such as sealability, anti-fogging property and tackiness were particularly poor (in the case of employing the third layer), thus involving the problem as the film for stretch wrapping.

We claim:

1. A multilayer oriented film excellent in sealability and stretchability, having high strength, high elongation and at least three layers comprising:
   (1) a base layer (M layer) containing primarily a specific mixed composition selected from the group of polymer compositions consisting of (A)+(B)+(C), (A)+(B) and (B)+(C);
   (A) being at least one ethylene type polymer selected from a low density polyethylene, a copolymer of ethylene with a monomer selected from the group consisting of a vinyl ester monomer, an aliphatic unsaturated mono-carboxylic acid, and an alkyl ester of said mono-carboxylic acid, and the derivatives of said copolymer;
   (B) being a soft elastomer having a Vicat softening point of 60° C. or lower;
   (C) being at least one polymer having a Vicat softening point of at least 100° C. selected from crystalline polypropylenes and crystalline polybutenes-1, at least one M layer being provided adjacent to a core layer;
   (2) an inside core layer (H layer) comprising primarily a polymer selected from (C); and
   (3) a surface layer (S layer) containing at least one polymer selected from polymer (A), soft elastomer (B), crystalline 1,2-polybutadiene and a soft ionomer resin from an ethylenic copolymer;
   said film having a stress on 100% elongation from 100 to 600 (g/cm-width) on average in the longitudinal and traverse directions.

2. The multilayer oriented film according to claim 1, wherein the polymer (A) comprises at least one selected from the group consisting of ethylene-vinyl acetate copolymers, ethylene-acrylate copolymers, ethylene-acrylic acid copolymers, ethylene-methacrylate copolymers, ethylene-methacrylic acid copolymers and ethylenic copolymer ionomer resins.

3. The multilayer oriented film according to claim 1, wherein the soft elastomer (B) is a copolymer elastomer comprising 90 to 20 mole % of ethylene and at least one α-olefin selected from the group consisting of α-olefins having 3 to 12 carbon atoms.

4. The multilayer oriented film according to claim 1, wherein the soft elastomer (B) is a copolymer elastomer having a Vicat softening point of 50° C. or lower and a crystallinity of 30% or lower.

5. The multilayer oriented film according to claim 1, wherein the soft elastomer (B) is a copolymer further containing a small amount of a polyene copolymerized therein in addition to ethylene and α-olefin.

6. The multilayer oriented film according to claim 1, wherein the soft elastomer (B) is a thermoplastic copolymer elastomer having a melt index of 0.1 to 10 and the α-olefin in the soft elastomer (B) is selected from propylene and butene-1.

7. The multilayer oriented film according to claim 1, having a mixed composition with the ratios of respective components satisfying the following relationships:

$$0.9 \geq B/(A+B) \geq 0.05; \text{ or}$$

$$0.90 \geq B/(B+C) \geq 0.30; \text{ or}$$

$$0.90 \geq B/(A+B) \geq 0.05; \text{ and}$$

$$2.0 \geq C/(A+B) \geq 0.05.$$

8. The multilayer oriented film according to claim 1, wherein the base layer (M layer) comprises a mixed composition of (A)+(B)+(C).

9. The multilayer oriented film according to claim 1, wherein the base layer (M layer) contains 1 to 30 wt. % of a carrier (AS agent) in addition to (A)+(B)+(C).

10. The multilayer oriented film according to claim 9, wherein the carrier (AS agent) is at least one selected from the group consisting of alicyclic saturated hydrocarbon resins, rosins, petroleum resins, terpene resins, cumarone resins or modified products thereof atactic polypropylenes (APP), 1,2-polybutadiene, and ethylene-vinyl acetate copolymers with high vinyl acetate content.

11. The multilayer oriented film according to claim 1, wherein the base layer contains at least one anti-fogging agent, plasticizer or mixtures there of in a total amount of 1 to 10 wt. %.

12. The multilayer oriented film according to claim 1, wherein the base layer (M layer) comprises 20 to 90%, the skin layer (S layer) 5 to 40% and the core layer (H layer) 5 to 40% of the total thickness, respectively.

13. The multilayer oriented film according to claim 1, having at least the layered structure of S layer/M layer/H layer/M layer/S layer.

14. The multilayer oriented film according to claim 1, having at least the layered structure of S layer/H layer/M layer/H layer/S layer.

15. The multilayer oriented film according to claim 1, having a stress on 200% elongation of 200 to 1,000 g/cm-width on average in the longitudinal and transverse directions.

16. The multilayer oriented film according to claim 1, wherein (A) is a copolymer of ethylene having a vinyl ester monomer and (C) is a crystalline polypropylene.

* * * * *